United States Patent
Yamamoto et al.

(10) Patent No.: US 12,462,672 B2
(45) Date of Patent: Nov. 4, 2025

(54) METHOD CARRIED OUT IN SYSTEM INCLUDING ACTIVE STYLUS AND SENSOR CONTROLLER, SENSOR CONTROLLER, AND ACTIVE STYLUS

(71) Applicant: Wacom Co., Ltd., Saitama (JP)

(72) Inventors: Sadao Yamamoto, Tokyo (JP); Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/793,280

(22) Filed: Aug. 2, 2024

(65) Prior Publication Data

US 2024/0395131 A1 Nov. 28, 2024

Related U.S. Application Data

(60) Continuation of application No. 18/177,674, filed on Mar. 2, 2023, now Pat. No. 12,087,153, which is a
(Continued)

(51) Int. Cl.
*G08C 17/02* (2006.01)
*G06F 3/041* (2006.01)
(Continued)

(52) U.S. Cl.
CPC ......... *G08C 17/02* (2013.01); *G06F 3/04162* (2019.05); *G06F 3/0441* (2019.05);
(Continued)

(58) Field of Classification Search
CPC .. G06F 3/03545; G06F 3/0441; G06F 3/0442; G06F 3/04162; H04B 1/7073;
(Continued)

(56) References Cited

U.S. PATENT DOCUMENTS 5,729,251 A 3/1998 Nakashima
5,883,338 A 3/1999 Trunck et al.
(Continued)

FOREIGN PATENT DOCUMENTS

EP 3098695 A1 11/2016
JP 2005141677 A 6/2005
(Continued)

*Primary Examiner* — Vinh T Lam
(74) *Attorney, Agent, or Firm* — Seed Intellectual Property Law Group LLP

(57) ABSTRACT

A sensor controller includes a transmitter configured to transmit an uplink signal including a first partial signal and a second partial signal. The transmitter is configured to transmit the first partial signal by direct spreading using a first spread code and transmit the second partial signal by direct spreading using a second spread code which is different from the first spread code and which has an identical chip time length to the first spread code. An active stylus includes a receiver configured to receive an uplink signal including a first partial signal and a second partial signal. The receiver is configured to synchronize with the uplink signal by detecting the first partial signal using a first spread code and thereafter detect the second partial signal using a second spread code, which is different from the first spread code and has an identical chip time length to the first spread code.

20 Claims, 19 Drawing Sheets

Related U.S. Application Data continuation of application No. 17/486,376, filed on Sep. 27, 2021, now Pat. No. 11,600,169, which is a continuation of application No. 17/234,604, filed on Apr. 19, 2021, now Pat. No. 11,132,895, which is a continuation of application No. 17/039,225, filed on Sep. 30, 2020, now Pat. No. 11,004,330, which is a division of application No. 16/520,461, filed on Jul. 24, 2019, now Pat. No. 10,861,323, which is a continuation of application No. PCT/JP2018/004344, filed on Feb. 8, 2018.

(60) Provisional application No. 62/462,184, filed on Feb. 22, 2017.

(51) Int. Cl.
*G06F 3/044* (2006.01)
*H04B 1/69* (2011.01)
*H04B 1/7073* (2011.01)

(52) U.S. Cl.
CPC ......... *G06F 3/0442* (2019.05); *H04B 1/7073* (2013.01); *G08C 2201/32* (2013.01); *H04B 2001/6912* (2013.01)

(58) Field of Classification Search
CPC ............ H04B 2001/6912; G08C 17/02; G08C 2201/32
See application file for complete search history.

(56) References Cited

U.S. PATENT DOCUMENTS

| | | | |
|---|---|---|---|
| 8,682,395 B2* | 3/2014 | Muhammad | G01S 13/876 345/173 |
| 9,355,553 B1 | 5/2016 | Mui | |
| 9,448,646 B1* | 9/2016 | Fleck | H04W 4/026 |
| 9,459,726 B2* | 10/2016 | Katsurahira | G06F 3/03548 |
| 9,639,183 B2* | 5/2017 | Fleck | G06F 3/0346 |
| 9,652,058 B2* | 5/2017 | Watanabe | G06F 3/0414 |
| 9,785,262 B2* | 10/2017 | Fleck | G06F 3/0416 |
| 9,921,667 B2* | 3/2018 | Fleck | G06F 3/04162 |
| 10,055,036 B2 | 8/2018 | Koike et al. | |
| 10,324,547 B2* | 6/2019 | Han | G06F 3/04166 |
| 10,331,235 B2* | 6/2019 | Fleck | G06F 3/0441 |
| 10,372,245 B2* | 8/2019 | Fleck | G06F 3/0446 |
| 10,474,280 B2 | 11/2019 | Jang et al. | |
| 10,579,183 B2 | 3/2020 | Hara et al. | |
| 10,761,619 B2 | 9/2020 | Park | |
| 10,809,817 B2 | 10/2020 | Katsurahira et al. | |
| 10,852,895 B2 | 12/2020 | Oda et al. | |
| 10,861,323 B2* | 12/2020 | Yamamoto | G06F 3/0441 |
| 11,004,330 B2 | 5/2021 | Yamamoto et al. | |
| 11,132,895 B2 | 9/2021 | Yamamoto et al. | |
| 11,397,482 B2 | 7/2022 | Miyamoto et al. | |
| 12,087,153 B2* | 9/2024 | Yamamoto | G08C 17/02 |
| 2007/0227785 A1 | 10/2007 | Katsurahira | |
| 2011/0090146 A1 | 4/2011 | Katsurahira | |
| 2012/0105362 A1 | 5/2012 | Kremin et al. | |
| 2014/0336854 A1* | 11/2014 | Salmon | B63H 21/22 701/21 |
| 2015/0123940 A1 | 5/2015 | Park et al. | |
| 2016/0019780 A1 | 1/2016 | Gettings et al. | |
| 2016/0162054 A1 | 6/2016 | Oda et al. | |
| 2016/0299583 A1 | 10/2016 | Watanabe | |
| 2016/0306445 A1 | 10/2016 | Fleck | |
| 2016/0306447 A1 | 10/2016 | Fleck et al. | |
| 2017/0192534 A1 | 7/2017 | Han et al. | |
| 2017/0192549 A1 | 7/2017 | Katayama et al. | |
| 2017/0192591 A1 | 7/2017 | Jang et al. | |
| 2017/0285771 A1 | 10/2017 | Jung et al. | |
| 2017/0331465 A1 | 11/2017 | Bogi et al. | |
| 2018/0024654 A1 | 1/2018 | Koike et al. | |
| 2018/0113523 A1 | 4/2018 | Hara et al. | |
| 2018/0120963 A1 | 5/2018 | Hara | |
| 2018/0120965 A1 | 5/2018 | Fleck et al. | |
| 2018/0157341 A1 | 6/2018 | Oda et al. | |
| 2018/0188836 A1 | 7/2018 | Park | |
| 2020/0050290 A1 | 2/2020 | Oda et al. | |

FOREIGN PATENT DOCUMENTS

| | | |
|---|---|---|
| JP | 2005300504 A | 10/2005 |
| JP | 2012029243 A | 2/2012 |
| JP | 6082172 B1 | 2/2017 |
| TW | 201702816 A | 1/2017 |
| WO | 2015111159 A1 | 7/2015 |
| WO | 2016163315 A1 | 10/2016 |
| WO | 2017002272 A1 | 1/2017 |

* cited by examiner

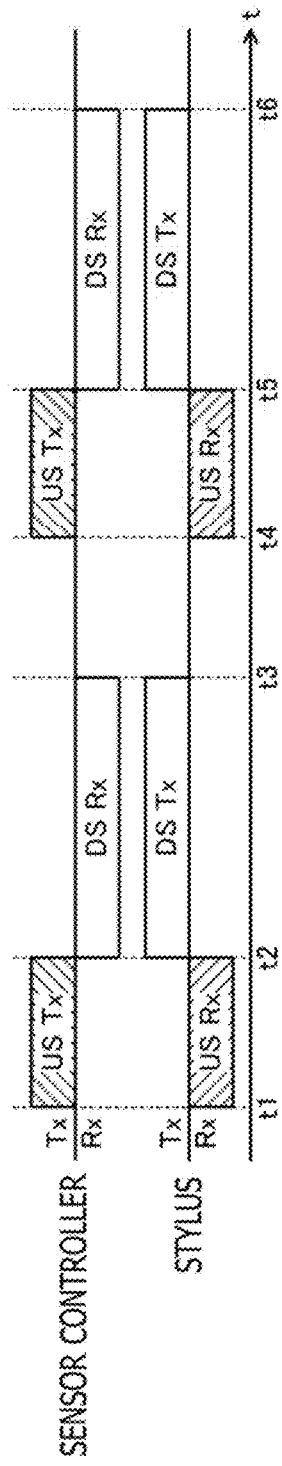
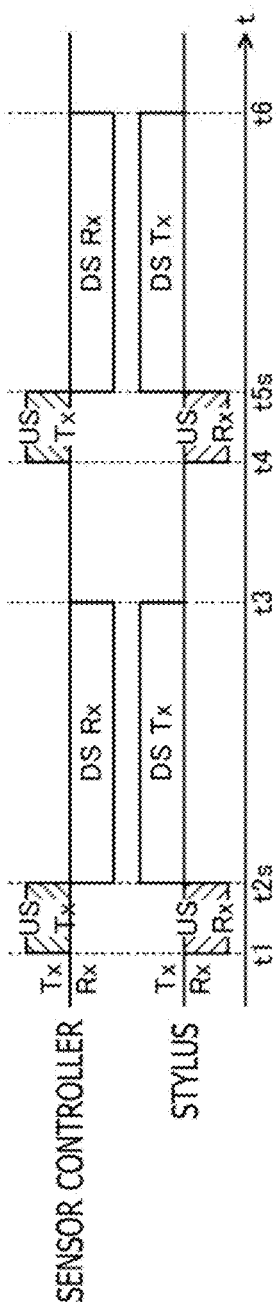
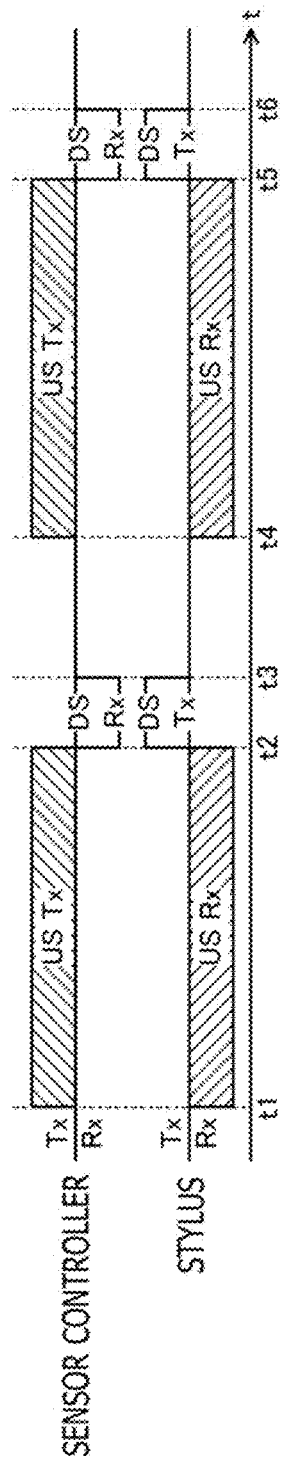
FIG. 8A
FIG. 8B
FIG. 8C

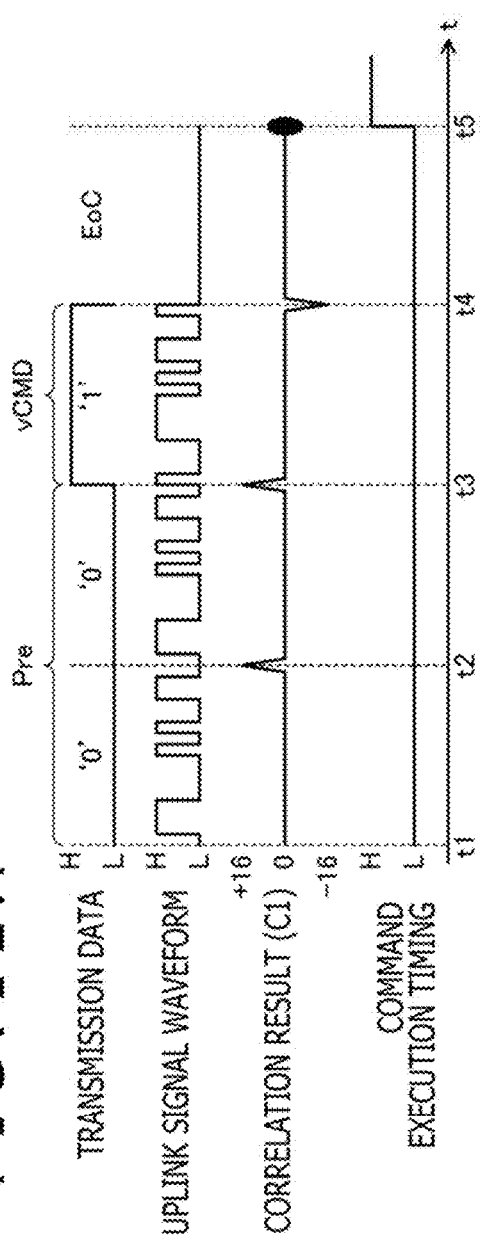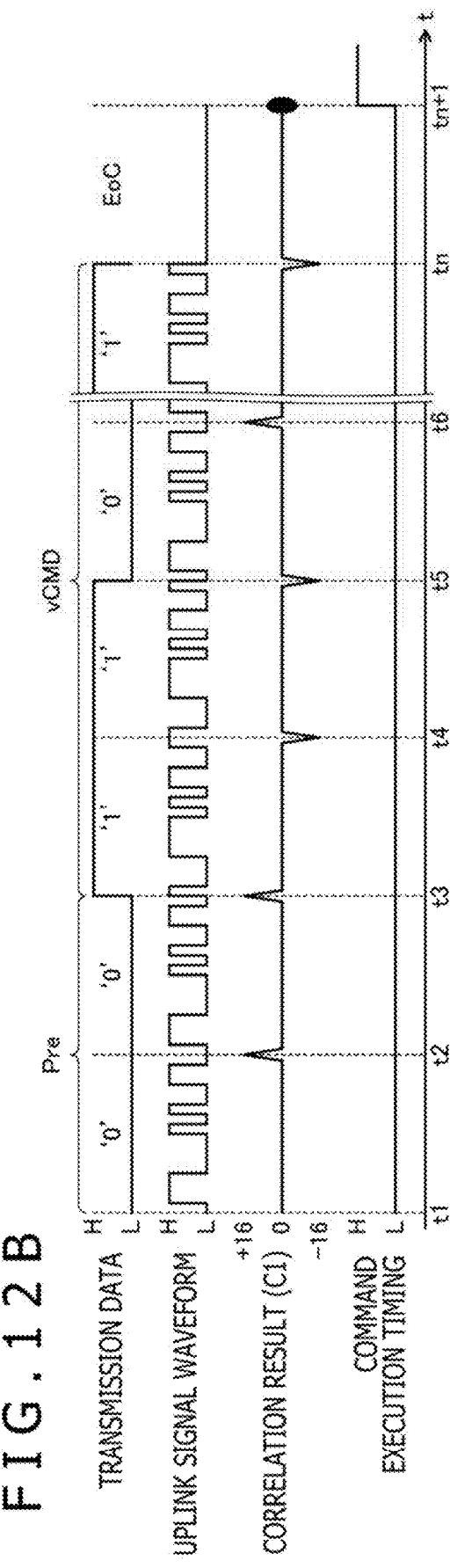

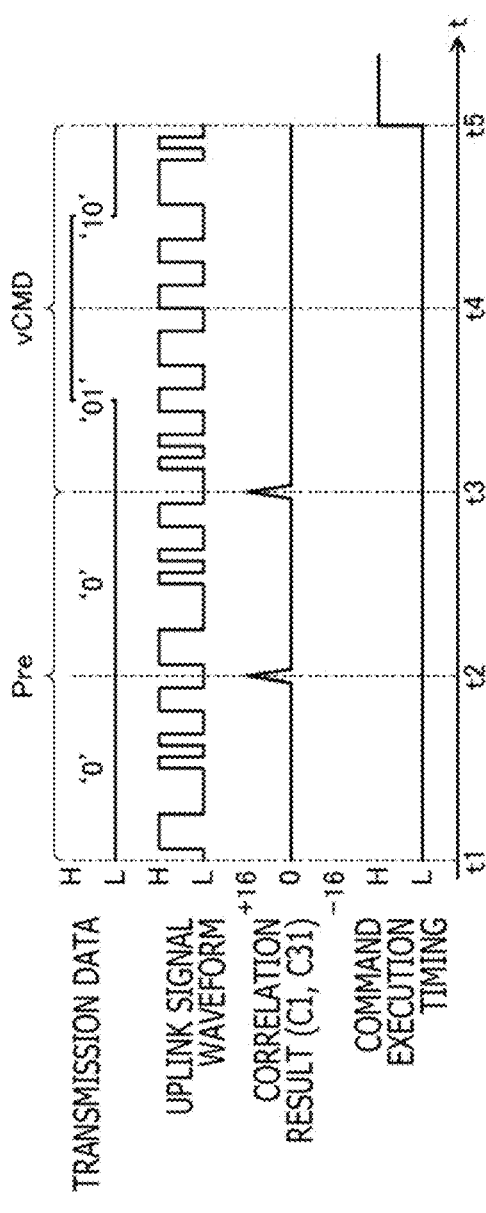
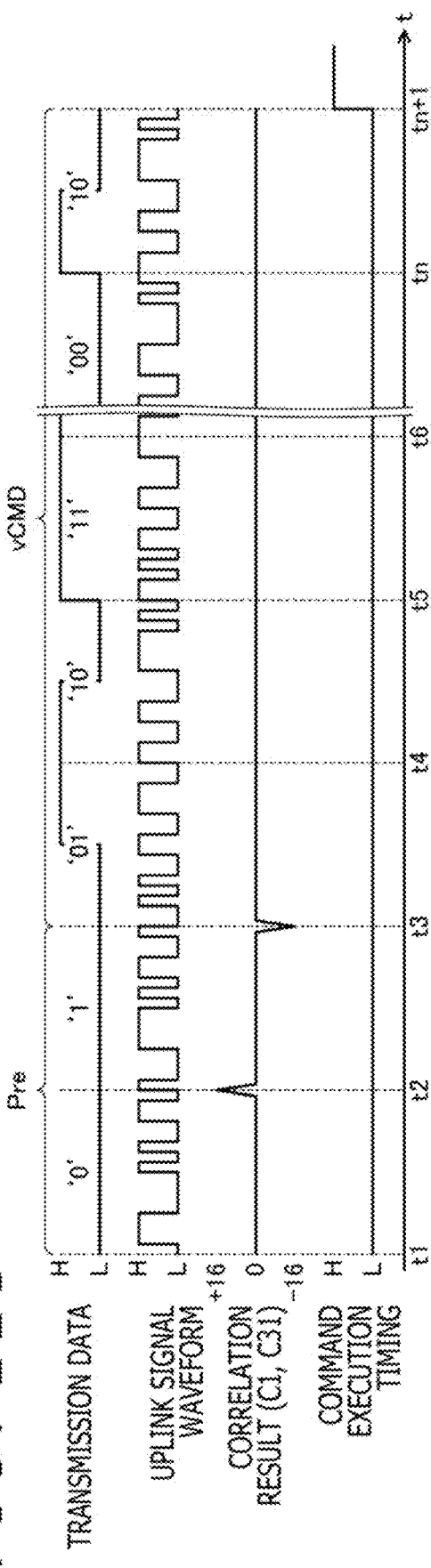

METHOD CARRIED OUT IN SYSTEM INCLUDING ACTIVE STYLUS AND SENSOR CONTROLLER, SENSOR CONTROLLER, AND ACTIVE STYLUS

BACKGROUND OF THE INVENTION

1. Field of the Invention

The present invention relates to a method carried out in a system including an active stylus and a sensor controller, a sensor controller, and an active stylus.

2. Description of the Related Art

Some touch-type input systems are arranged such that a stylus can send signals to a sensor controller. An example of such input system is disclosed in WO2015/111159.

In recent years, there have been seen input systems in which not only a stylus sends signals to a sensor controller, but also the sensor controller sends signals to the stylus. The former signals will hereinafter be referred to as "downlink signal," and the latter signals as "uplink signal." Those input systems that are capable of bidirectional communication can use communication resources efficiently because the stylus can be operated by a command sent from the sensor controller to the stylus.

However, providing bidirectional communication is performed on time-division principles, some of the communication resources are occupied by uplink signals. As a result, the communication time that can be used to send downlink signals is reduced. Consequently, the input systems remain to be improved.

SUMMARY OF THE INVENTION

An object of the present invention is to reduce the proportion of communication resources occupied by uplink signals sent from a sensor controller to a stylus, i.e., an uplink signal occupancy ratio, among the communication resources that can be used to send and receive signals between the stylus and the sensor controller.

According to a first aspect of the present invention, there is provided a method carried out in a system including an active stylus and a sensor controller, including a synchronizing step for establishing frame synchronization between the sensor controller and the active stylus, an instructing step in which the sensor controller selects a first variable-length command from a plurality of variable-length commands each of which can include data of a variable number of bits and sends the selected first variable-length command with an uplink signal having a variable time length depending on the number of bits of the first variable-length command in a first frame, a receiving step in which the active stylus detects the uplink signal and the variable time length using a receiving circuit and receives the first variable-length command by continuing to decode the uplink signal up to the tail of the variable time length, and a transmitting step in which the active stylus sends a downlink signal depending on the received first variable-length command in the rest of the first frame using a control circuit and a transmitting circuit.

According to the first aspect of the present invention, there is provided a sensor controller including a transmitter establishing frame synchronization with an active stylus, thereafter selecting a first variable-length command from a plurality of variable-length commands each of which can include data of a variable number of bits, and sending the selected first variable-length command with an uplink signal having a time length depending on the number of bits of the first variable-length command in a first frame, and a receiver receiving a downlink signal which the active stylus has sent depending on the first variable-length command in the rest of the first frame.

According to the first aspect of the present invention, there is provided an active stylus including a receiver establishing frame synchronization with a sensor controller and thereafter receiving a first variable-length command selected from a plurality of variable-length commands each of which can include data of a variable number of bits, by detecting an uplink signal which the sensor controller has sent in a first frame, and a transmitter sending a downlink signal depending on the received first variable-length command in the rest of the first frame.

According to a second aspect of the present invention, there is provided a method carried out in a system including an active stylus and a sensor controller, including a transmitting step in which the second controller sends an uplink signal including a first partial signal and a second partial signal, and a receiving step in which the active stylus receives the uplink signal, in which, in the transmitting step, the sensor controller sends the first partial signal by way of direct spreading using a first spread code and sends the second partial signal by way of direct spreading using a second spread code which is a code different from the first spread code and which has an identical chip time length to the first spread code, and in the receiving step, the active stylus is synchronized with the uplink signal by detecting the first partial signal using the first spread code and thereafter detects the second partial signal using the second spread code.

According to the second aspect of the present invention, there is provided a sensor controller including a transmitter sending an uplink signal including a first partial signal and a second partial signal, in which the transmitter sends the first partial signal by way of direct spreading using a first spread code and sends the second partial signal by way of direct spreading using a second spread code which is a code different from the first spread code and which has an identical chip time length to the first spread code.

According to the second aspect of the present invention, there is provided an active stylus including a receiver receiving an uplink signal including a first partial signal and a second partial signal, in which the receiver is synchronized with the uplink signal by detecting the first partial signal using a first spread code and thereafter detects the second partial signal using a second spread code which is a code different from the first spread code and which has an identical chip time length to the first spread code.

According to the first aspect of the present invention, since the time length of the uplink signal sent by the sensor controller is adjusted depending on the number of bits of a variable-length command to be sent, it is possible to reduce an uplink signal occupancy ratio.

According to the second aspect of the present invention, inasmuch the code length of the second spread code used after synchronization can be shorter than the code length of the first spread code used for synchronization, it is possible to further reduce the uplink signal occupancy ratio.

The above and other objects, features, and advantages of the present invention will become more apparent from the following description when taken in conjunction with the accompanying drawings.

BRIEF DESCRIPTION OF THE DRAWINGS

FIGS. 8A through 8C are diagrams illustrating advantages of the first embodiment of the present invention;

FIGS. 12A and 12B are diagrams illustrating a method for sending and receiving variable-length commands according to the third modification of the first embodiment of the present invention;

FIGS. 22A and 22B are diagrams illustrating a method for sending and receiving variable-length commands according to a modification of the third embodiment of the present invention.

DETAILED DESCRIPTION OF THE PREFERRED EMBODIMENTS

Preferred embodiments of the present invention will hereinafter be described in detail with reference to the accompanying drawings.

Figure 1:
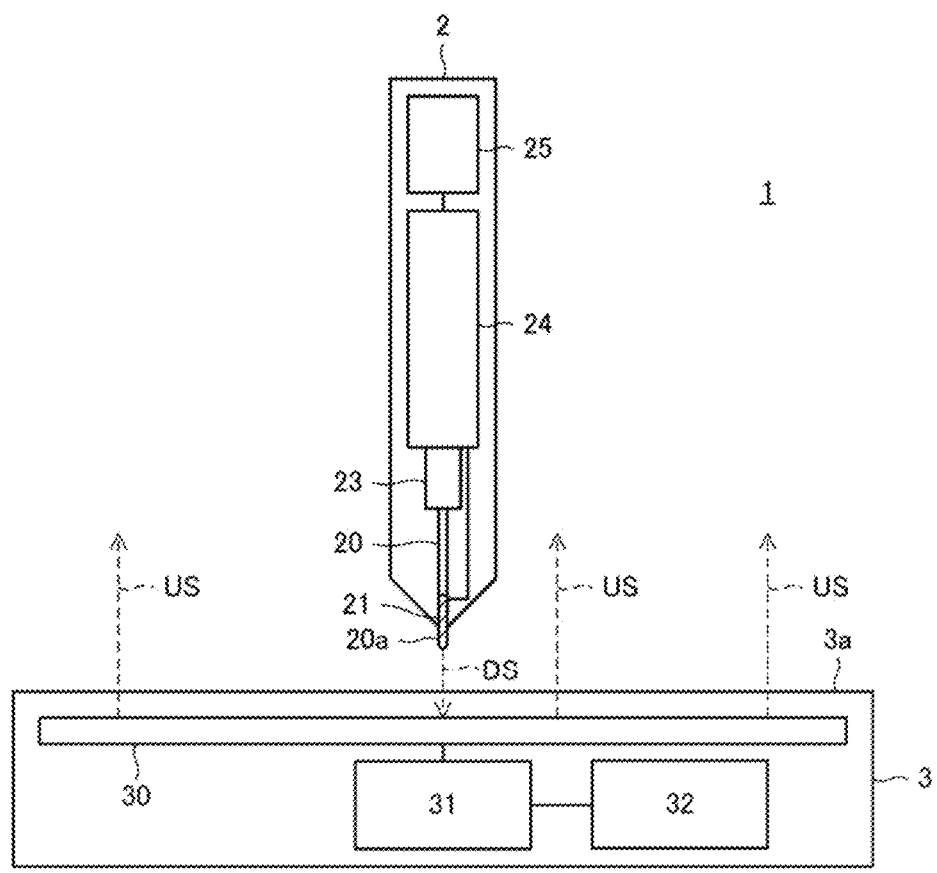
FIG. 1 is a view illustrating the makeup of a system according to a first embodiment of the present invention.

FIG. 1 is a view illustrating the makeup of a system 1 according to a first embodiment of the present invention. As illustrated in FIG. 1, the system 1 includes a stylus 2 and an electronic device 3. The electronic device 3 is either a digitizer connected to a separate PC or a tablet PC having a display device, for example. The electronic device 3 is arranged to enter line drawings by moving the stylus 2 or a finger, not illustrated, on a panel surface 3a.

The stylus 2 is an active stylus of the electrostatic capacitance type. As illustrated in FIG. 1, the stylus 2 has a core 20, an electrode 21, a pen pressure detection sensor 23, a signal processor 24, and a power supply 25.

The core 20 is a rod-shaped member disposed such that its longitudinal directions are aligned with the penholder directions of the stylus 2. The core 20 has a tip end portion 20a whose surface is coated with an electrically conductive material, functioning as an electrode 21. The core 20 has a rear end portion held against the pen pressure detection sensor 23. When the tip end portion 20a of the core 20 is pressed against the panel surface 3a or the like, the pen pressure detection sensor 23 detects a pen pressure level commensurate with the pressure applied to the tip end portion 20a, i.e., a pen pressure applied to the core 20. According to a specific example, the pen pressure detection sensor 23 includes a variable-capacitance module whose electrostatic capacitance varies depending on the pen pressure applied thereto.

The electrode 21 is electrically connected to the signal processor 24 by interconnects. When the signal processor 24 supplies a downlink signal DS to the electrode 21, the electrode 21 induces electric charges commensurate with the supplied downlink signal DS. The induced electric charges cause changes in an electrostatic capacitance in a sensor 30, to be described later, and a sensor controller 31, to be described later, receives the downlink signal DS by detecting the changes. When an uplink signal US sent from the sensor controller 31 via the sensor 30 arrives at the electrode 21, the electrode 21 induces electric charges commensurate with the uplink signal US that has arrived. The signal processor 24 receives the uplink signal US by detecting the electric charges induced by the electrode 21.

The signal processor 24 has a function to receive an uplink signal US sent from the sensor controller 31 via the electrode 21 and a function to generate a downlink signal DS according to a command, to be described later, included in the received uplink signal US and send the downlink signal DS to the sensor controller 31 via the electrode 21.

The power supply 25 serves to supply operating electric power (DC voltage) to the signal processor 24, and includes a cylindrical AAAA cell, for example.

The electronic device 3 has a sensor 30 that provides the panel surface 3a, a sensor controller 31, and a host processor 32 for controlling the functions of components of the electronic device 3 that include the sensor 3 and the sensor controller 31.

The sensor controller 31 has a function to send an uplink signal US to the stylus 2 via the sensor 30. An uplink signal US is a signal having a variable length, i.e., a variable time length, where the time length differs depending on control content. The uplink signal US includes a control command, i.e., a variable-length command vCMD to be described later, whose variable length represents control content for the stylus 2. The sensor controller 31 also has a function to receive a downlink signal DS sent from the stylus 2 via the sensor 30.

Figure 2:
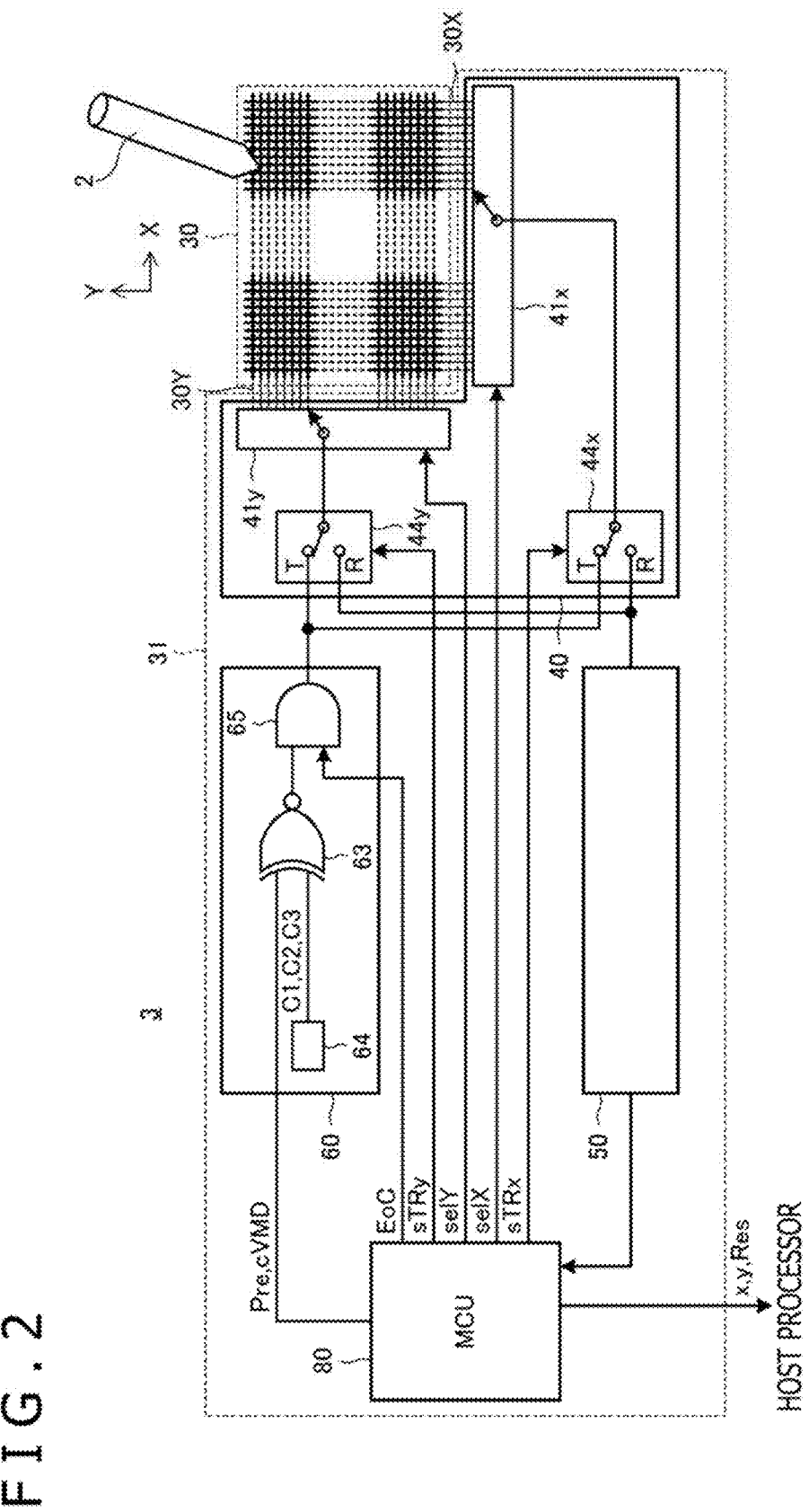
FIG. 2 is a diagram illustrating the makeup of a sensor and a sensor controller illustrated in FIG. 1.
Figure 3A:
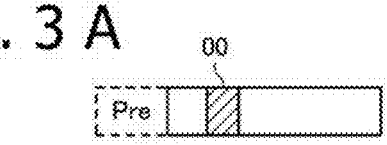
FIGS. 3A through 3D are diagrams illustrating variable-length commands according to the first embodiment of the present invention.
Figure 3B:
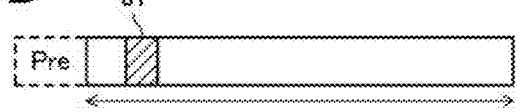
Figure 3C:
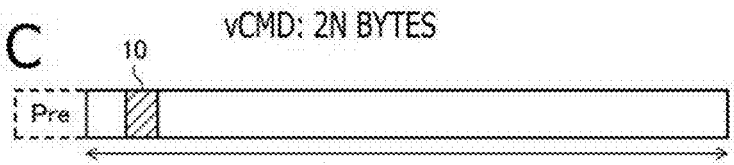
Figure 3D:
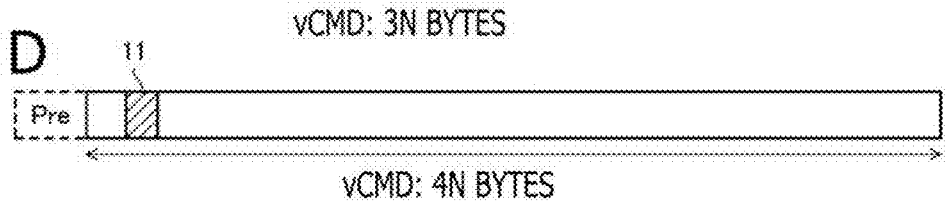

FIG. 2 is a diagram illustrating the makeup of the sensor 30 and the sensor controller 31 illustrated in FIG. 1. As illustrated in FIG. 2, the sensor 30 has a matrix of linear electrodes 30X and linear electrodes 30Y and is capacitively coupled to the electrode 21 (see FIG. 1) of the stylus 2 by the linear electrodes 30X, 30Y. The sensor controller 31 has a transmitter 60, a selector 40, a receiver 50, and an MCU 80.

The MCU 80 is a processor having functions to control the components of the sensor controller 31. Specifically, the MCU 80 has a function to supply the transmitter 60 with data to be sent as an uplink signal US (hereinafter referred to as "transmission data") and a command end value EoC indicative of the end of the transmission data, a function to receive a downlink signal DS output from the receiver 50, derive the position (x, y) of the stylus 2 based on the received downlink signal DS, acquire data Res sent from the stylus 2, and supply the acquired data Res to the host processor 32, and a function to control the selector 40 to switch between the sending of an uplink signal US and the reception of a downlink signal DS and select linear electrodes used to send an uplink signal US and linear electrodes used to receive a downlink signal DS.

The transmission data that are supplied from the MCU 80 to the transmitter 60 include a preamble Pre and a variable-length command vCMD following the preamble Pre. The preamble Pre is made up of known data, e.g., a bit string "00" having a 2-bit length, shared with the stylus 2. The variable-length command vCMD represents arbitrary data having a variable length which indicates control content for the stylus 2. The MCU 80 selects one, i.e., a first variable-length command, of a plurality of variable-length commands each of which can include data represented by a variable number of bits.

The MCU 80 sends uplink signals US and receives downlink signals DS in respective frames. In each frame, the MCU 80 outputs a bit string as a preamble Pre at the leading end of the frame to the transmitter 60, then outputs a bit string as a variable-length command vCMD to the transmitter 60, and thereafter receives a downlink signal DS in the rest of the frame. Consequently, the sensor controller 31 periodically sends preambles Pre accompanying variable-length commands vCMD repeatedly to the stylus 2, and, on all such occasions, the stylus 2 sends downlink signals DS depending on the content of the variable-length commands vCMD to the sensor controller 31. The preambles Pre that are sent in the respective frames serve to supply a frame reference time from the sensor controller 31 to the stylus 2.

FIGS. 3A through 3D are diagrams illustrating variable-length commands vCMD according to the present embodiment. According to the present embodiment, a variable-length command vCMD to be sent is selected from four kinds of variable-length commands vCMD, whose sizes are represented by N bytes, 2 N bytes, 3 N bytes, and 4 N bytes, respectively, illustrated in FIGS. 3A through 3D. These variable-length commands vCMD have respective length fields, illustrated hatched, indicative of their sizes at common given positions. In the example illustrated in FIGS. 3A through 3D, each of the length fields has a bit length of 2. The length fields have respective four values "00," "01," "10," "11" that can be expressed by 2 bits, associated respectively with N bytes, 2 N bytes, 3 N bytes, and 4 N bytes. Stated otherwise, based on a selected variable-length command vCMD to be sent, the MCU 80 determines the number of bits of the variable-length command vCMD, and changes the value of the length field in the variable-length command vCMD based on the determined number of bits. The stylus decodes the value of the length field in the variable-length command vCMD received thereby, and determines a time during which to continue receiving the variable-length command vCMD depending on the decoded value. It is thus possible to appropriately decode the variable-length command vCMD in its entirety.

The sizes of variable-length commands vCMD may not necessarily be of four kinds, but may be of two or more kinds. The bit length of a length field may be suitably adjusted depending on the number of alternative sizes of variable-length commands vCMD.

Referring back to FIG. 2, the transmitter 60 is a circuit for generating an uplink signal US based on transmission data supplied from the MCU 80 and outputting the generated uplink signal US to the selector 40. The transmitter 60 includes a direct spreader 63, a spread code holder 64, and a transmission guard unit 65. A modulator for performing phase shift keying (PSK) modulation, i.e., Manchester encoding, or the like may be placed in a stage following the direct spreader 63.

The spread code holder 64 has a function to hold and output one or more spread codes C1, C2, C3.

The spread code C1 is, for example, a PN code "0111000010100110" of 16 chips (bits) illustrated in an upper row in FIG. 18A, to be described later. However, the spread code C1 is not limited to a PN code, but may be a code string having autocorrelation characteristics.

Figure 15:
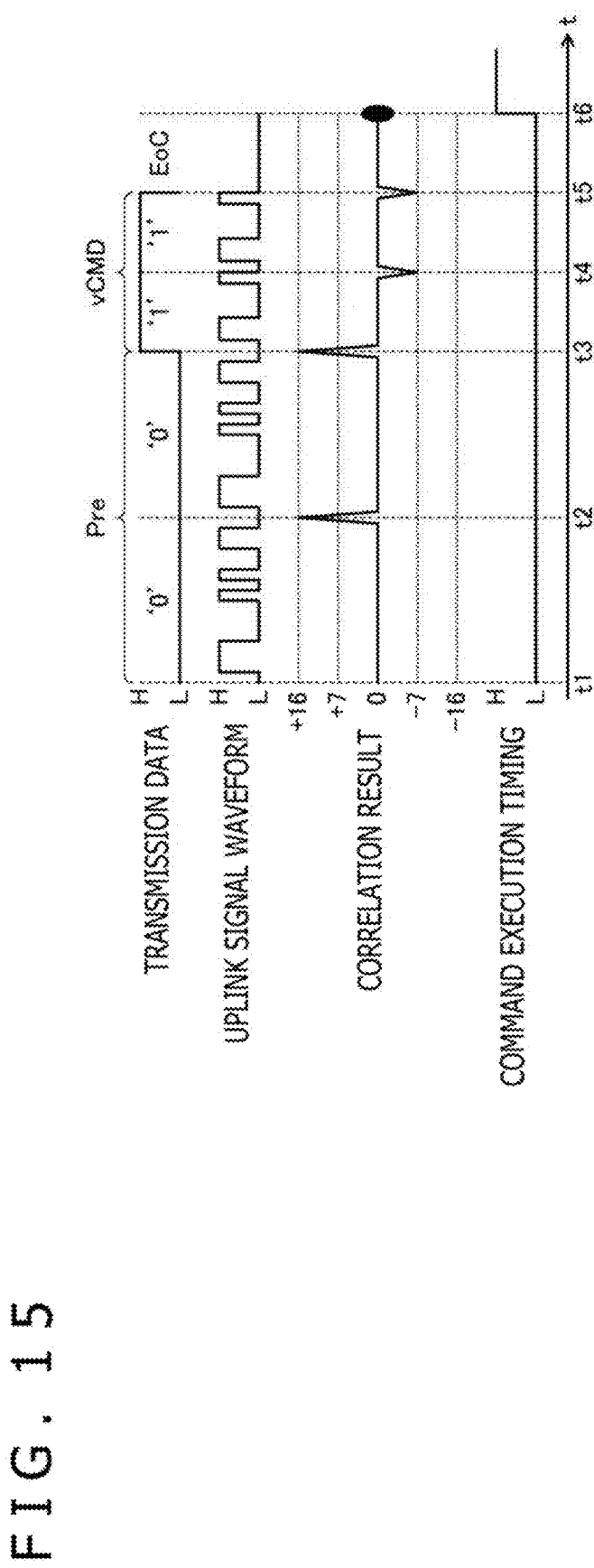
FIG. 15 is a diagram illustrating a method for sending and receiving a variable-length command according to a second embodiment of the present invention.

The spread code C2 is a PN code whose code length is shorter than the spread code C1, and is, for example, a PN code "0110001" of seven chips (see times t3 through t5 in FIG. 15). However, the spread code C2 is not limited to a PN code, but may be a code string having a property for increasing the noise resistance of a bit string to be sent, e.g., a code string having autocorrelation characteristics. The time length of individual chips, i.e., a chip time length, of the spread code C2 may be the same as the chip time length of the spread code C1. Furthermore, a plurality of spread codes C2 may make up a spread code C1, e.g., a plurality of spread codes C2 may be joined together into a spread code C1. According to a specific example, a 21-bit code generated by joining three 7-chip spread codes C2 may be used as a spread code C1 for increasing the detection level of a peak value, making it possible to determine, with higher accuracy, a timing of synchronization with an uplink signal itself, and also making it possible to simply the makeup of a correlation processor 71b, to be described later, in the stylus 2.

The spread code C3 refers to a generic term for spread code variations obtained by cyclically shifting a spread code C1 by predetermined chips or reversing the polarity of such cyclically shifted spread codes. For example, spread codes C31, C32, C33, C31r, C32r, C33r illustrated in FIG. 18B come under the spread code C3. The spread code C31 is a spread code C1 itself. The spread code C32 is a spread code obtained by shifting the spread code C31 by five bits. The spread code C33 is a spread code obtained by shifting the spread code C32 by five bits. The spread code C31r is a spread code obtained by reversing the spread code C31. The spread code C32r is a spread code obtained by reversing the spread code C32. The spread code C33r is a spread code obtained by reversing the spread code C33.

Though the spread codes C1, C2, C3 have been described above, only the spread code C1 is used according to the present embodiment. Therefore, it is enough for the spread code holder 64 to store at least the spread code C1. The spread codes C2, C3 will be described in greater detail in second and third embodiments, respectively.

Figure 5:
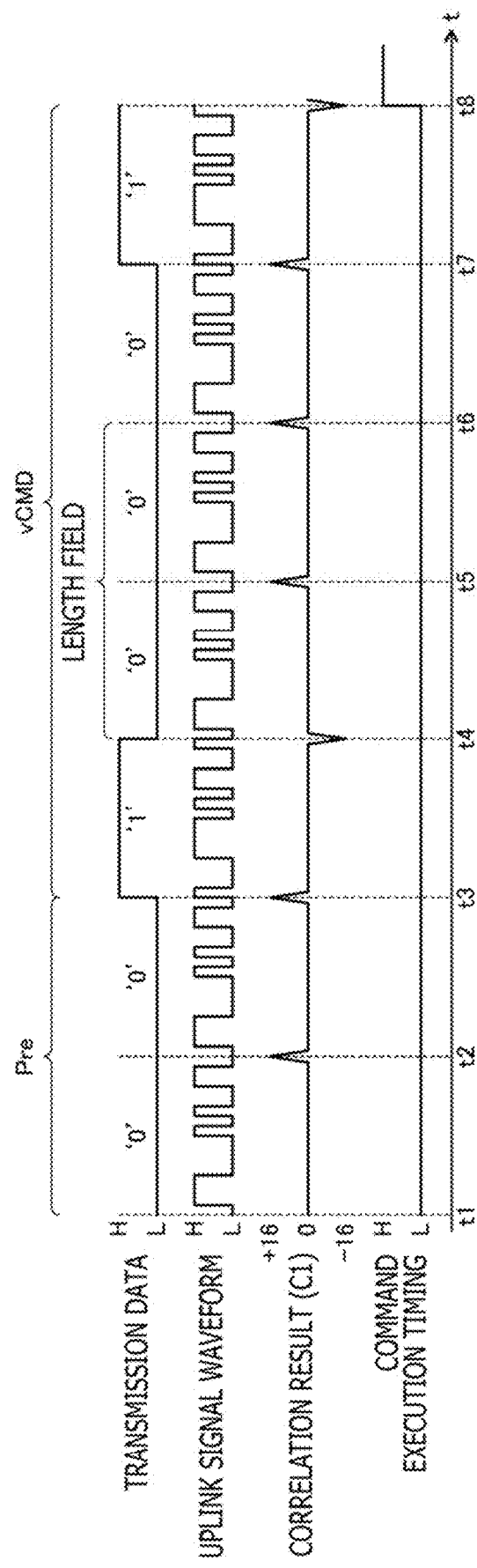
FIG. 5 is a diagram illustrating a method for sending and receiving a variable-length command illustrated in FIGS. 3A through 3D.

The direct spreader 63 has a function to generate an uplink signal US according to a direct spreading process, e.g., a direct spectrum spreading process, using the spread code output from the spread code holder 64. An uplink signal US generated by the process performed by the direct spreader 63 is made up of a series of spread codes depending on the values of transmission data, as illustrated in FIG. 5 to be described later. The uplink signal US has a time length depending on the number of bits of a variable-length command vCMD included therein.

Specific makeups of the direct spreader 63 include a logic circuit for exclusive-ORing the bit values of transmission data and the spread code, and a circuit for holding bit values of spread codes in a memory and outputting spread codes corresponding to bit values of the transmission data from the memory. Since the spread code C1 is used in the present embodiment, the direct spreader 63 outputs a spread code C1 corresponding to each bit value "0" of the transmission data and outputs a code (hereinafter referred to as "spread code C1r"), which is a reversal of the spread code C1, corresponding to each bit value "1" of the transmission data.

The transmission guard unit 65 has a function to stop outputting an uplink signal US based on a command end value EoC supplied from the MCU 80.

The selector 40 is a switch for switching between a transmission period in which the sensor 30 sends an uplink signal US and a reception period in which the sensor 30 receives a downlink signal DS, under the control of the MCU 80. The selector 40 includes switches 44x, 44y and conductor selecting circuits 41x, 41y. The switch 44x operates to connect an output terminal of the transmitter 60 to an input terminal of the conductor selecting circuit 41x during the transmission period for sending an uplink signal US and to connect an output terminal of the conductor selecting circuit 41x to an input terminal of the receiver 50 during the reception period for receiving a downlink signal DS, based on a control signal sTRx supplied from the MCU 80. The switch 44y operates to connect the output terminal of the transmitter 60 to an input terminal of the conductor selecting circuit 41y during the transmission period for sending an uplink signal US and to connect an output terminal of the conductor selecting circuit 41y to the input terminal of the receiver 50 during the reception period for receiving a downlink signal DS, based on a control signal sTRy supplied from the MCU 80. The conductor selecting circuit 41x operates to select one or more, at a time, of the linear electrodes 30X and connect the selected linear electrode or electrodes 30X to the switch 44x, based on a control signal selX supplied from the MCU 80. The conductor selecting circuit 41y operates to select one or more, at a time, of the linear electrodes 30Y and connect the selected linear electrode or electrodes 30Y to the switch 44y, based on a control signal selY supplied from the MCU 80.

The receiver 50 is a circuit for detecting or receiving a downlink signal DS sent from the stylus 2. The receiver 50 includes an amplifying circuit, a detecting circuit, an analog-to-digital (AD) converter, etc., not illustrated. The receiver 50 supplies a detected or receiver downlink signal DS to the MCU 80.

Figure 4:
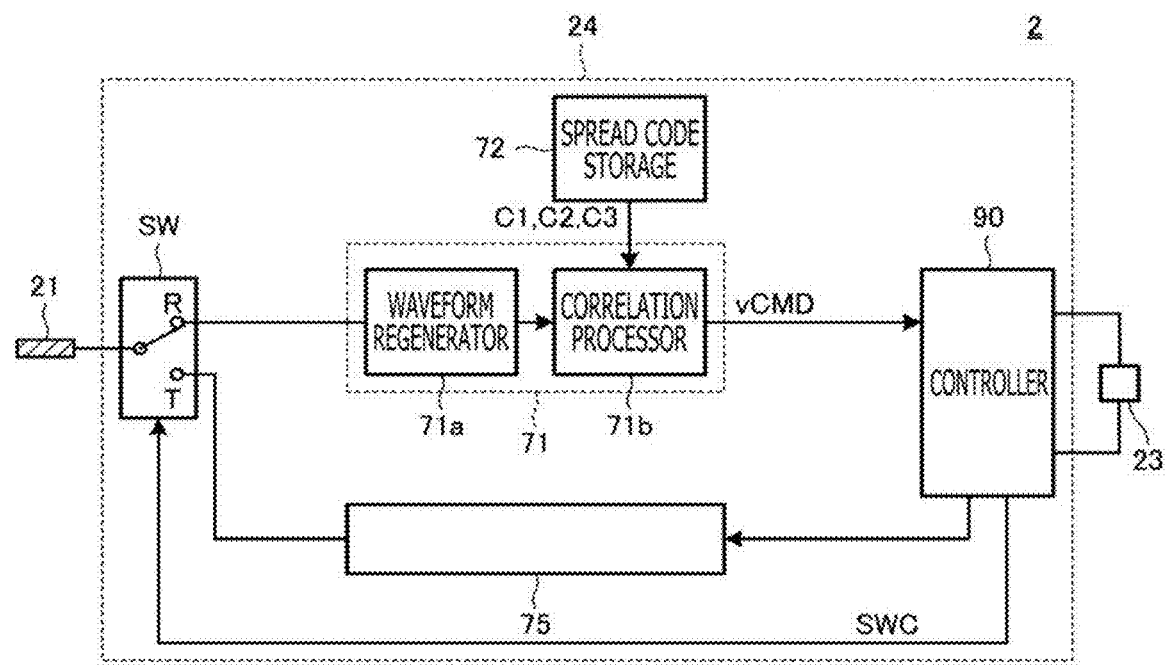
FIG. 4 is a substantial block diagram illustrating functional blocks of a stylus illustrated in FIG. 1.

FIG. 4 is a substantial block diagram illustrating functional blocks of the stylus 2. As illustrated in FIG. 4, the stylus 2 includes a switch unit SW, a receiver 71 (receiving circuit), a spread code storage 72, a transmitter 75 (transmitting circuit), and a controller 90 (control circuit).

The switch unit SW is a switch for switching between a reception mode R and a transmission mode T based on a control signal SWC from the controller 90. In the reception mode R, the switch unit SW connects an electrode 21 to the receiver 71. In the transmission mode T, the switch unit SW connects the electrode 21 to the transmitter 75. The switch unit SW may alternatively have an electrode for receiving an uplink signal US and an electrode for sending a downlink signal DS, separately from each other.

The spread code storage 72 is a storage for storing the spread codes C1, C2, C3 referred to above. However, since only the spread code C1 is used in the present embodiment, the spread code storage 72 may not store the spread codes C2, C3.

The receiver 71 includes a waveform regenerator 71a and a correlation processor 71b. The waveform regenerator 71a shapes the levels of electric charges (voltages) induced in the electrode 21 into a binary string having positive and negative polarity values, which corresponds to the chip string of a spread code, and outputs the binary string. The correlation processor 71b stores the binary string having positive and negative polarity values output from the waveform regenerator 71a in a register array, and performs a correlation operation on the binary string with respect to the spread code C1 stored in the spread code storage 72 while successively shifting the binary string with a block CLK, not illustrated.

The receiver 71 receives a variable-length command vCMD by detecting an uplink signal US and its time length and continuing decoding the uplink signal US up to the tail of the detected time length. More specifically, the receiver 71 first detects a preamble Pre based on the correlation operation performed by the correlation processor 71b. The receiver 71 acquires a frame reference time by detecting the preamble Pre, and detects a variable-length command vCMD according to the acquired frame reference time. For detecting a variable-length command vCMD, the receiver 71 detects the time length of the uplink signal US from the information, i.e., the length field in the present embodiment, included in the uplink signal US, and continues decoding the uplink signal US up to the tail of the detected time length. After having detected the variable-length command vCMD in its entirety, the receiver 71 supplies the detected variable-length command vCMD to the controller 90.

FIG. 5 is a diagram illustrating a method for sending and receiving a variable-length command vCMD according to the present embodiment. FIG. 5 illustrates a variable-length command vCMD where N illustrated in FIGS. 3A through 3D is 5, i.e., a variable-length command vCMD that is of 5 bytes in case the 2-bit length field is "00." FIG. 5 illustrates an example where the length field is positioned at second and third bits of the variable-length command vCMD.

As illustrated in FIG. 5, the result of the correlation operation performed by the correlation processor 71b indicates a positive peak value at the timing when each of a spread code representing "0," i.e., a spread code C1, has been received in its entirety and a negative peak value at the timing when each of a spread code representing "1," i.e., a spread code C1r, has been received in its entirety. The receiver 71 detects that "0" or "1" has been received by confirming the occurrence of a peak value and its negative or positive value. The receiver 71 then determines the bit length of a variable-length command vCMD by confirming the bit value detected as the length field, i.e., "00" in the example illustrated in FIG. 5, acquires a bit string commensurate with the determined bit length as a variable-length command vCMD, and supplies the acquired variable-length command vCMD to the controller 90. When the controller 90 is supplied with the variable-length command vCMD, the controller 90 executes the supplied variable-length command vCMD, i.e., a command execution timing goes high.

Referring back to FIG. 4, the controller 90 includes a microprocessor (MCU). Upon detection of the uplink signal US by the receiver 71, the controller 90 is activated to perform various processing sequences for sending a downlink signal DS to the sensor controller 31 based on the content of the variable-length command vCMD supplied from the receiver 71. The various processing sequences include a process for acquiring a present pen pressure level from the pen pressure detection sensor 23 illustrated in FIG. 1, a process for reading a stylus ID held in a nonvolatile memory, not illustrated, a process for changing carrier wave frequencies, etc.

The transmitter 75 is a circuit for sending a downlink signal DS that is obtained by modulating a carrier wave having a preset frequency and boosting the carrier wave based on the value of the pen pressure level supplied from the controller 90, etc. The downlink signal DS is sent through the switch unit SW and radiated from the electrode 21 into space.

Operation of the sensor controller 31 and the stylus 2 according to the present embodiment will be described in detail with reference to respective operation sequences thereof.

Figure 6:
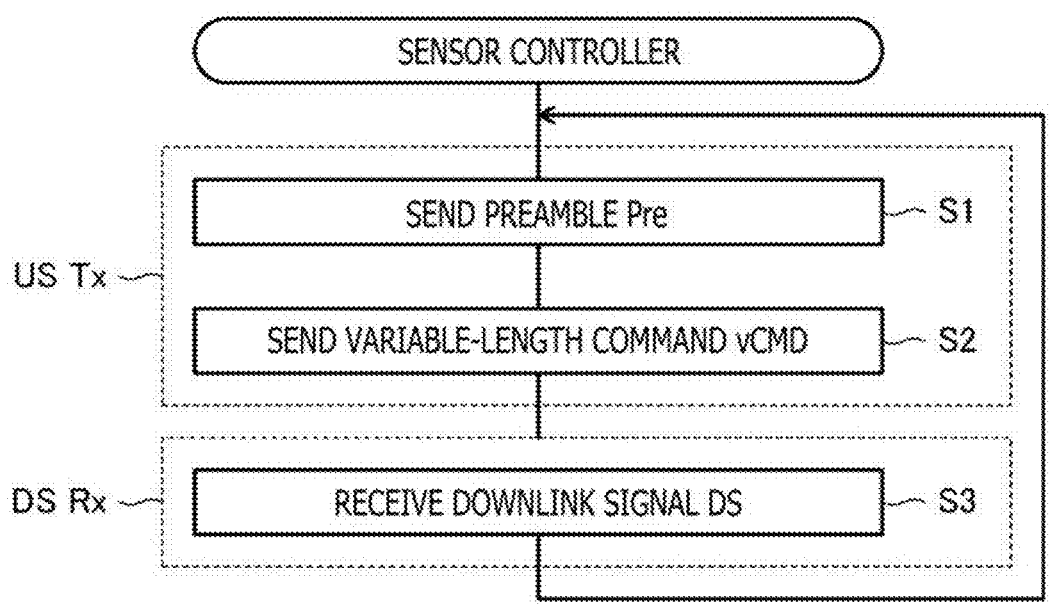
FIG. 6 is a flowchart illustrating operation of the sensor controller according to the first embodiment of the present invention.

FIG. 6 is a flowchart illustrating operation of the sensor controller 31 according to the present embodiment. As illustrated in FIG. 6, at a timing to send an uplink signal US, the sensor controller 31 first sends a preamble Pre (step S1). As described above, the preamble Pre has a value of "00," for example. Then, the sensor controller 31 selects one, i.e., a first variable-length command, of a plurality of variable-length commands vCMD each having a variable number of bits, and sends, within a first frame, the first variable-length command vCMD as an uplink signal US having a time length commensurate with the number of bits of the first variable-length command vCMD (instructing step, step S2). Thereafter, the sensor controller 31 detects or receives a downlink signal DS sent from the stylus 2 in the rest of the first frame (step S3), upon which control returns to step S1.

Figure 7:
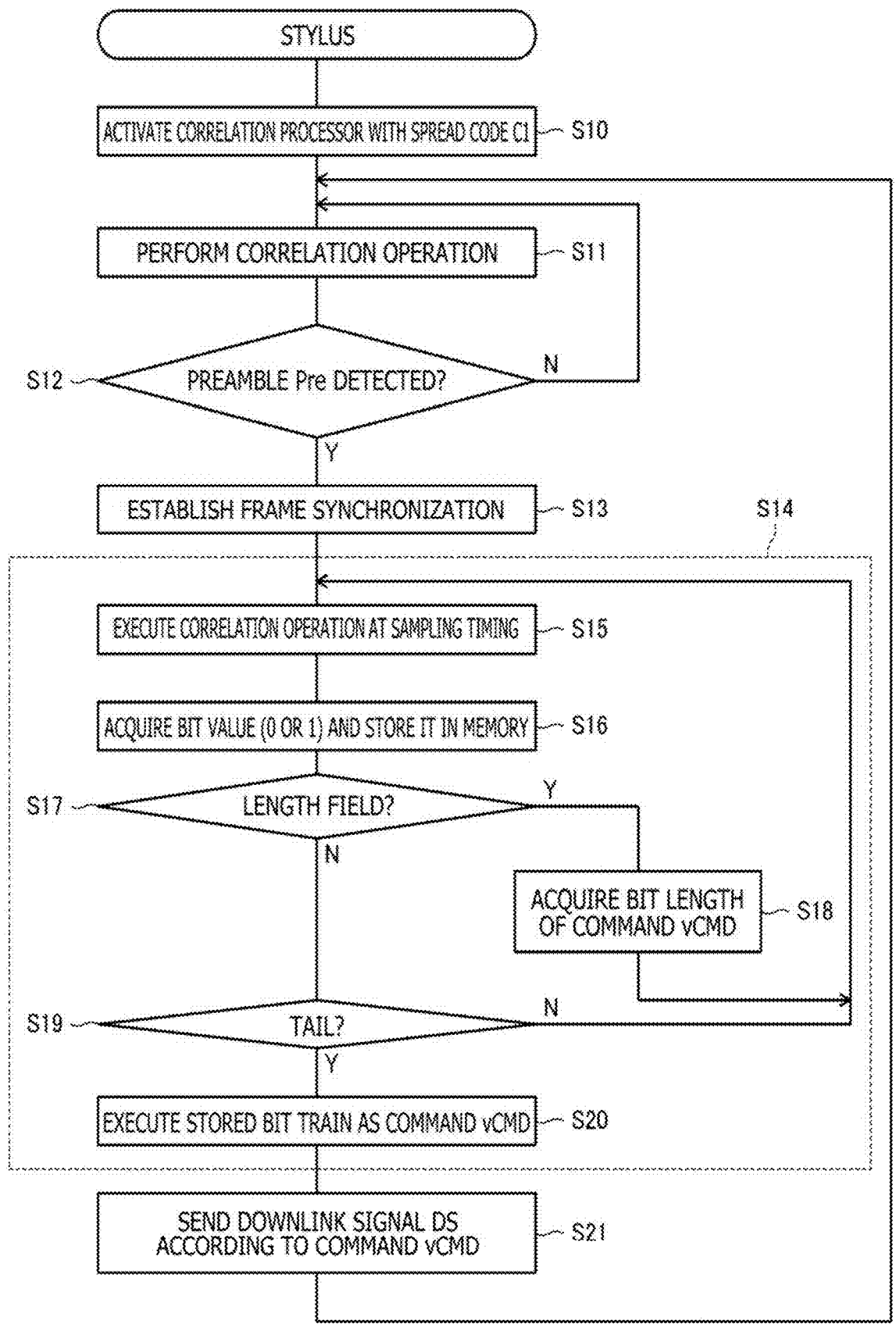
FIG. 7 is a flowchart illustrating operation of the stylus according to the first embodiment of the present invention.

FIG. 7 is a flowchart illustrating operation of the stylus 2 according to the present embodiment. As illustrated in FIG. 7, the stylus 2 first activates the correlation processor 71b with a spread code C1 (step S10). The result of a correlation operation output from the correlation processor 71b thus activated indicates a positive peak value in case a spread code C1 has been received and a negative peak value in case a spread code C1r has been received, as described above.

The stylus 2 causes the correlation processor 71b to perform successive correlation operations until a preamble Pre is detected (step S11, negative in step S12). The processing of step S11 may be carried out intermittently at a predetermined interval. Providing a preamble Pre represents "00," for example, the determined result of step S12 is affirmative only when two positive peak values are successively detected at predetermined time intervals, as indicated at times t2, t3 in FIG. 5.

After having detected a preamble Pre (affirmative in step S12), the stylus 2 establishes frame synchronization with the sensor controller 31 (synchronizing step, step S13), and then detects an uplink signal US and its time length using the receiver 71 illustrated in FIG. 4 and receives a variable-length command vCMD within a broken-line frame illustrated in FIG. 7 by continuously decoding the uplink signal US up to the tail of the detected time length (receiving step, step S14). Specifically, the processing of step S13 represents a process for synchronizing timings to receive individual spread codes indicating respective bits of the variable-length command vCMD with the sensor controller 31 based on a frame reference time, described above, acquired by detecting the preamble Pre. According to this synchronizing process, the stylus 2 acquires timings, i.e., sampling timings, at which to cause the correlation processor 71b to perform correlation operations.

In the process for receiving the variable-length command vCMD, the stylus 2 causes the correlation processor 71b to perform correlation operations at the sampling timings obtained in step S13 (step S15). According to the example illustrated in FIG. 5, for example, times t4 through t8 correspond to sampling timings.

The stylus 2 acquires bit values, which may be of "0" or "1," based on the polarity of peak values obtained as a result of the correlation operations carried out in step S15. The stylus 2 then stores the acquired bit values in a memory, not illustrated, as values of part of the variable-length command vCMD (step S16). According to the example illustrated in FIG. 5, for example, bit values of "1," "0," "0," "0," "1" are stored in the memory respectively at times t4 through t8.

Then, based on the bit values acquired so far, the stylus 2 determines whether a length field has newly been detected or not (step S17). If the stylus 2 determines that a length field has newly been detected, then the stylus 2 acquires a bit length of the variable-length command vCMD (step S18), after which control goes back to step S15. On the other hand, if the stylus 2 determines that a length field has not newly been detected, then the stylus 2 determines whether the tail of the variable-length command vCMD is reached or not (step S19). This determining process is performed based on the bit length of the variable-length command vCMD acquired in step S18.

If the stylus 2 determines whether the tail of the variable-length command vCMD is not reached in step S19, then control returns to step S15. On the other hand, if the stylus 2 determines whether the tail of the variable-length command vCMD is reached in step S19, then the stylus 2 acquires the values of a bit train stored in the memory so far as the values of the variable-length command vCMD, and executes or interprets the acquired bit train as a command (step S20). According to the example illustrated in FIG. 5, for example, the timing at which to execute the command is a time t8.

Finally, the stylus 2 sends a downlink signal DS according to the variable-length command vCMD, for example, a downlink signal DS including values with respect to data (a pen pressure level, etc.) designated by the variable-length command vCMD at a frequency designated by the variable-length command vCMD, in the rest of the first frame referred to above, using the controller 90 and the transmitter 75 illustrated in FIGS. 3A through 3D (transmitting step, step S21).

According to the present embodiment, as described above, the time length of an uplink signal US to be sent by the sensor controller 31 is adjusted depending on the number of bits of a variable-length command vCMD to be sent. Therefore, it is possible to reduce the proportion of communication resources occupied by uplink signals US sent from the sensor controller 31 to the stylus 2, i.e., an uplink signal occupancy ratio, among the communication resources that can be used to send and receive signals between the stylus 2 and the sensor controller 31.

FIGS. 8A through 8C are diagrams illustrating advantages of the present embodiment. In FIGS. 8A through 8C, blocks illustrated hatched with lines running up to the right represent periods in which the sensor controller 31 sends an uplink signal US, and blocks illustrated hatched with lines running down to the right represent periods in which the stylus 2 receives an uplink signal US. In the example illustrated in FIGS. 8A through 8C, times t1 through t3 correspond to a first frame, and times t4 through t6 to a second frame. A period, i.e., times t3 through t4, between the frames is used to perform other processes, e.g., to detect a finger touch, energize a liquid crystal, etc.

FIG. 8A illustrates a diagram illustrating operation of the sensor controller 31 and the stylus 2 using conventional fixed-length uplink signals US according to a comparative example.

The sensor controller 31 sends fixed-length uplink signals US in fixed periods, i.e., times t1 through t2 and times t4 through t5, positioned at leading ends of respective frames (US Tx), and receives downlink signals DS in the rests of the frames, i.e., times t2 through t3 and times t5 through t6 (DS Rx). The stylus 2 receives the fixed-length uplink signals US in the fixed periods, i.e., times t1 through t2 and times t4 through t5, positioned at the leading ends of the respective frames (US Rx), and sends the downlink signals DS in the rests of the frames, i.e., times t2 through t3 and times t5 through t6 (DS Tx). Since the time lengths of the uplink signals US are fixed, if commands to be sent are short, the communication resources are consumed wastefully.

FIGS. 8B and 8C illustrate diagrams illustrating operation of the sensor controller 31 and the stylus 2 using variable-length uplink signals US according to the present embodiment. FIGS. 8B and 8C illustrate a shorter command to be sent in FIG. 8B and a longer command to be sent in FIG. 8C.

According to the present embodiment, as illustrated in FIG. 8B, uplink signals US are shorter as the command to be sent is shorter. Therefore, it is possible to reduce the uplink signal occupancy ratio. As can be understood from a comparison between FIG. 8A and FIG. 8B, it is also possible to send uplink signals US more frequently and send downlink signals DS more frequently for an increased positional detection rate. If a shorter bit string is used as a command to be sent more frequently, then it is possible to reduce the energy that is consumed by the sensor controller 31 and the stylus 2 in sending and receiving uplink signals US.

Furthermore, according to the present embodiment, as illustrated in FIG. 8C, uplink signals US are longer as the command to be sent is longer. Therefore, inasmuch as a longer command can be sent all together, it is possible to increase the rate of information transmission. Specific examples of longer commands include commands that are required to send information represented by many bits to the stylus 2 in rather scarcely occurring occasions for updating the stylus ID of the stylus 2 and updating the firmware of the stylus 2.

Figure 9A:
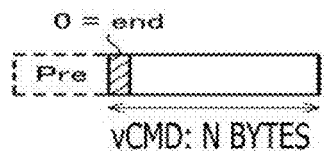
FIGS. 9A and 9B are diagrams illustrating a variable-length command according to a first modification of the first embodiment of the present invention.
Figure 9B:
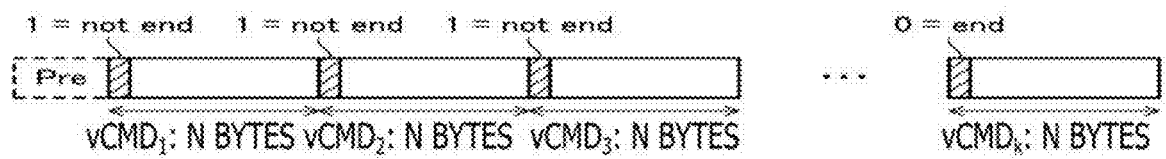

FIGS. 9A and 9B are diagrams illustrating a variable-length command vCMD according to a first modification of the present embodiment. According to the present modification, the variable-length command vCMD includes one or more fields having a predetermined byte length (N bytes in FIGS. 9A and 9B). The field or each of the fields has a flag, illustrated hatched, of a 1-bit length, for example, indicating whether there is a next field or not. The flag is used for the stylus 2 to detect the time length of the uplink signal US, or stated otherwise, the terminal end of the variable-length command vCMD.

According to the example illustrated in FIGS. 9A and 9B, a flag of 1 indicates that "there are subsequent N bytes (not end)," and a flag of 0 indicates that "there are no subsequent N bytes (end)." FIG. 9A illustrates s that the variable-length command vCMD is of N bytes, i.e., a first flag is of "0," and FIG. 9B illustrates that the variable-length command vCMD is of N×K bytes, i.e., a Kth portion vCMDK of the variable-length command vCMD is of "0."

With the variable-length command vCMD according to the present modification, the time length of an uplink signal US to be sent by the sensor controller 31 is also adjusted depending on the number of bits of a variable-length commands vCMD to be sent. Consequently, it is possible to reduce the uplink signal occupancy ratio.

Of the one or more fields of the variable-length command vCMD, a second field to be sent next to a first field may be sent so as to follow the first field continuously, or may be sent after elapse of a predetermined time from the completion of the sending of the first field. The present modification is thus applicable to a situation where the variable-length command vCMD can be sent continuously in its entirety and also a situation where the variable-length command vCMD has to be sent intermittently by using a liquid crystal energization idle period as a time slot.

Figure 10A:
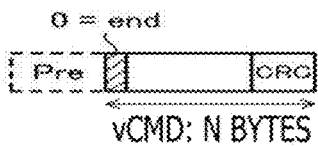
FIGS. 10A and 10B are diagrams illustrating a variable-length command according to a second modification of the first embodiment of the present invention.
Figure 10B:
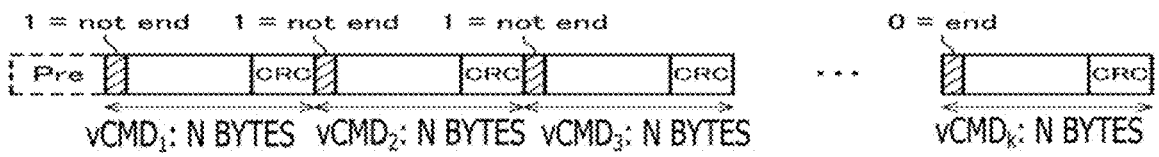

FIGS. 10A and 10B are diagrams illustrating a variable-length command vCMD according to a second modification of the present embodiment. The variable-length command vCMD according to the present modification is different from the variable-length command vCMD according to the first modification in that the field or each of the fields of the variable-length command vCMD includes a cyclic redundancy check (CRC) field that includes an error detection value calculated from a bit train obtained from the value of a bit train included in the field. When the stylus 2 receives the variable-length command vCMD according to the present modification, the stylus 2 calculates an error detection value or values based on a bit train or trains included in the field or fields, compares the error detection value or values with the value or values included in the corresponding CRC field or fields, and sends a downlink signal DS if the compared value or values are the same in all the field or fields.

The present modification is effective to reduce the possibility of sending a downlink signal DS according to a variable-length command vCMD that is not correct. Moreover, compared with using a CRC whose length is commensurate with the data length of variable-length data at the tail of the variable-length data, as with CRCs in typical data communication, it is possible to detect errors in respective fields using one CRC detecting circuit in the stylus 2 without a plurality of logics for CRC detection, with the result that the circuit scale of the stylus 2 can further be reduced.

Figure 11A:
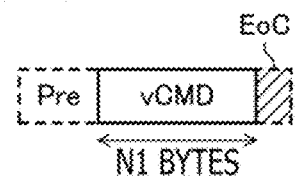
FIGS. 11A and 11B are diagrams illustrating a variable-length command according to a third modification of the first embodiment of the present invention.
Figure 11B:
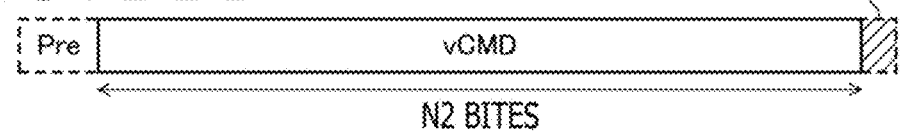

FIGS. 11A and 11B are diagrams illustrating a variable-length command vCMD according to a third modification of the present embodiment. According to the present modification, a special bit sequence or end field corresponding to a command end value EoC is included. By detecting this special bit sequence, the stylus 2 detects the time length of an uplink signal US, and ends receiving the variable-length command vCMD. FIG. 11A illustrates that the variable-length command vCMD is of N1 bytes, and FIG. 11B illustrates that the variable-length command vCMD is of N2 bytes (N2>N1).

Various data may be considered as specific content of the special bit sequence corresponding to the command end value EoC. According to one example, no data may be sent during a time length required to send one spread code C1. Such an example will be described in specific detail below.

FIGS. 12A and 12B are diagrams illustrating a method for sending and receiving variable-length commands vCMD according to the present modification. The variable-length commands vCMD illustrated in FIGS. 12A and 12B are the same as each other except their bit lengths are different from each other.

As illustrated in FIGS. 12A and 12B, the sensor controller 31 according to the present modification first sends two "0s" as a preamble Pre (times t1 through t3). The waveform of an uplink signal US during this period represents the waveform of the spread code C1. Then, the sensor controller 31 sends a bit train representing specific content of a variable-length command vCMD (times t3 through t4 in FIG. 12A and times t3 through tn in FIG. 12B). The waveform of the uplink signal US represents the waveform of the spread code C1 when the transmission bit is of "0," and represents the waveform of the spread code C1r when the transmission bit is of "1." Finally, the sensor controller 31 sends no signal but stands by during a time length required to send one spread code C1 (times t4 through t5 in FIG. 12A and times tn through tn+1 in FIG. 12B.) A command end value EoC is thus sent implicitly.

From the standpoint of the stylus 2, the peak values represented by the results of correlation operations, which have periodically appeared after the preamble Pre has been detected, do no appear at the time of receiving a command end value EoC. Therefore, the stylus 2 can detect a command value EoC by not observing the peak values represented by the results of correlation operations.

Figure 13:
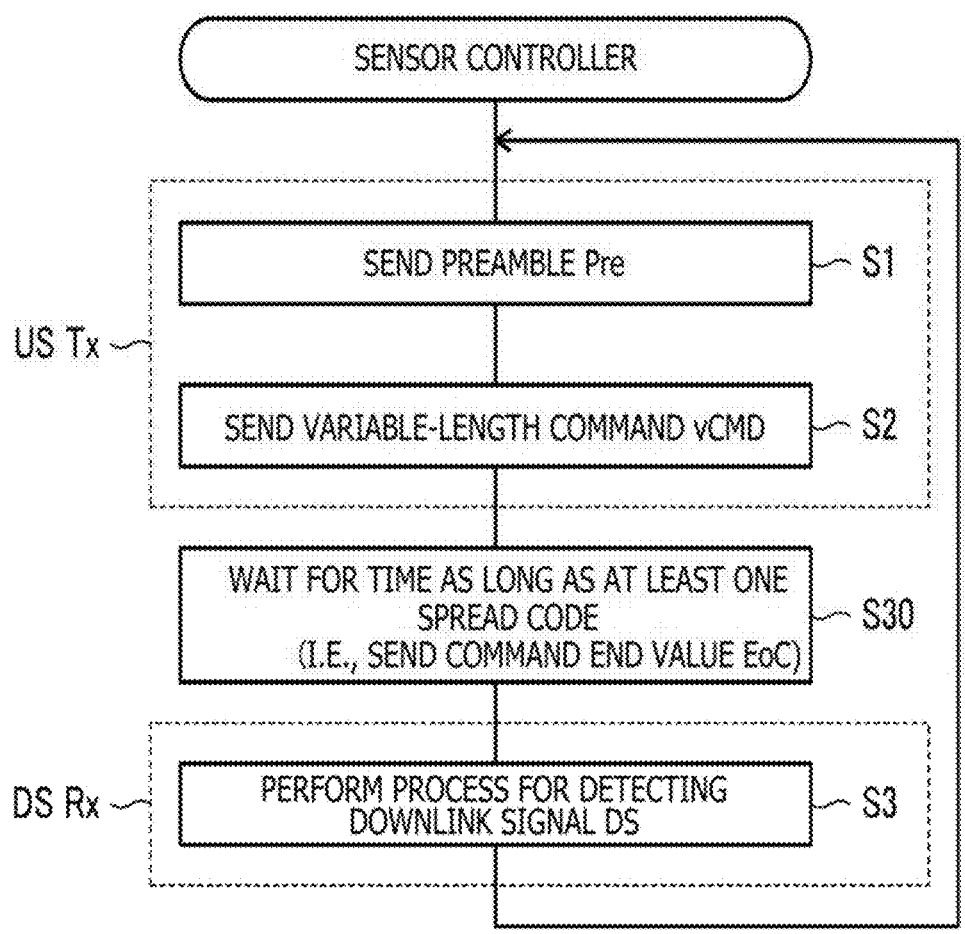
FIG. 13 is a flowchart illustrating operation of a sensor controller according to the third modification of the first embodiment of the present invention.

FIG. 13 is a flowchart illustrating operation of a sensor controller 31 according to the present modification. The operation illustrated in FIG. 13 is different from the operation illustrated in FIG. 6 in that a standby time is added between step S2 and step S3. Specifically, after the transmission of the variable-length command vCMD has all been ended, the sensor controller 31 sends a command end value EoC by standing by for a time as long as at least one spread code without sending a spread code (standing by step, step S30). Thereafter, the sensor controller 31 detects a downlink signal DS sent by the stylus 2 (step S3), after which control returns to step S1.

Figure 14:
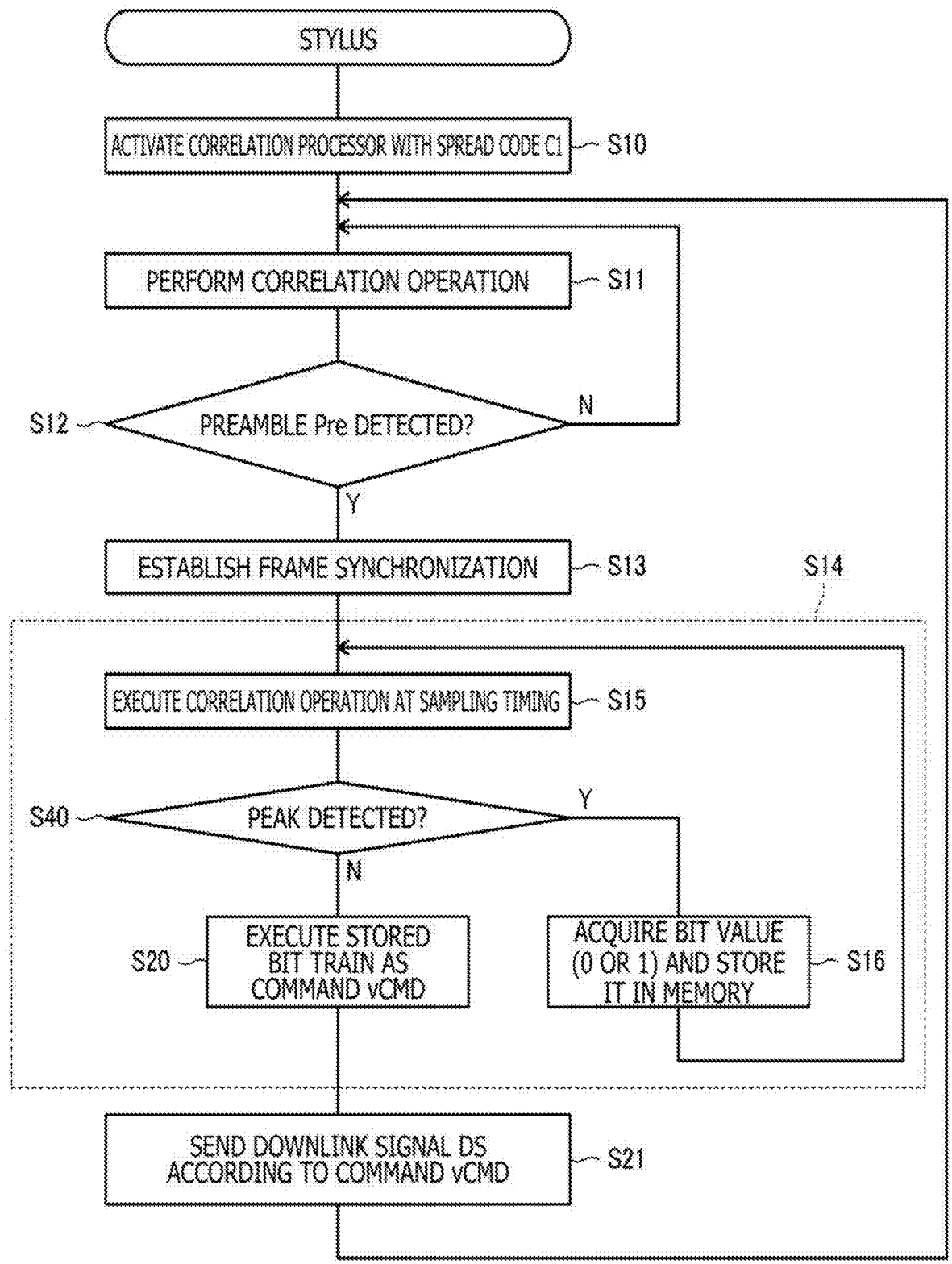
FIG. 14 is a flowchart illustrating operation of a stylus according to the third modification of the first embodiment of the present invention.

FIG. 14 is a flowchart illustrating operation of the stylus 2 according to the present modification. The operation illustrated in FIG. 14 is different from the operation illustrated in FIG. 7 in that steps S17 through S19 illustrated in FIG. 7 are not provided and a determining process of step S40 is added between step S15 and step S16. Specifically, after having caused the correlation processor 71b to perform correlation operations in step S15, the stylus 2 determines whether a peak value has been detected or not (step S40). If the stylus 2 determines that a peak value has been detected, then the stylus 2 acquires a bit value depending on the polarity of the bit value and stores the acquired bit value in a memory, not illustrated, as a value of part of the variable-length command vCMD (step S16). According to this process, for example, a bit value of "1" is stored in the memory at a time t4 in the example illustrated in FIG. 12A. In the example illustrated in FIG. 12B, bit values of "1," "1," "0," . . . "1" are stored in the memory respectively at times t4 through tn.

If the stylus 2 determines in step S40 that no peak value has been detected, then the stylus 2 regards the detection of no peak value as detecting a command end value EoC and ends receiving the variable-length command vCMD (reception ending step). The stylus 2 acquires the values of a bit train stored in the memory so far as the values of the variable-length command vCMD, and executes or interprets the acquired bit train as a command (step S20). The timing at which to execute the command is a time t5 in the example illustrated in FIG. 12A. The timing at which to execute the command is a time tn+1 in the example illustrated in FIG. 12B. The subsequent process is exactly the same as described above with reference to FIG. 7.

With the variable-length command vCMD according to the present modification, the time length of an uplink signal US to be sent by the sensor controller 31 is also adjusted depending on the number of bits of a variable-length commands vCMD to be sent. Consequently, it is possible to reduce the uplink signal occupancy ratio.

A second embodiment of the present invention will be described below. The present embodiment is based on the third modification of the first embodiment, but is different therefrom in that different spread codes are used when a preamble Pre (first partial signal) of an uplink signal US is sent and when a variable-length command vCMD (second partial signal) thereof is sent, or specifically, a spread code C1 is used when a preamble Pre is sent and a spread code C2 is used when a variable-length command vCMD is sent. Those parts which are identical to those of the third modification of the first embodiment will hereinafter be denoted by identical reference characters, and the differences with the third modification of the first embodiment will be focused on and described below.

FIG. 15 is a diagram illustrating a method for sending and receiving a variable-length command vCMD according to the present embodiment. As illustrated in FIG. 15, a sensor controller 31 according to the present embodiment spreads "00" corresponding to a preamble Pre with the direct spreader 63 illustrated in FIG. 2, using a 16-chip spread code C1 and sends the spread preamble Pre (times t1 through t3). Then, the sensor controller 31 sends a variable-length command vCMD. At this time, the sensor controller 31 spreads a bit train representing the variable-length command vCMD using a spread code C2 whose code length is shorter than the spread code C1 (times t3 through t5). Specifically, the sensor controller 31 sends "0" of the variable command vCMD with the spread code C2 and sends "1" of the variable command vCMD with a code that is a reversal of the spread code C2. Finally, the sensor controller 31 sends a command end value EoC as with the third modification of the first embodiment. In this case, however, the time length of a period in which to send a special bit sequence corresponding to a command end value EoC, i.e., the time length of a period in which to send no data, may be equal to or longer than a time length required to send one spread code C2. Instead of sending a command end value EoC, the length field illustrated in the first embodiment or the flag illustrated in the first modification of the first embodiment may be sent.

After having detected the preamble Pre using the spread code C1, the stylus 2 acquires the value of the variable-length command vCMD using the spread code C2 whose code length is shorter than the spread code C1. As illustrated in FIG. 15, the spread code C1 and the spread code C2 have different specific peak values. Consequently, the stylus 2 detects the preamble Pre and the variable-length command vCMD with different peak values.

Figure 16:
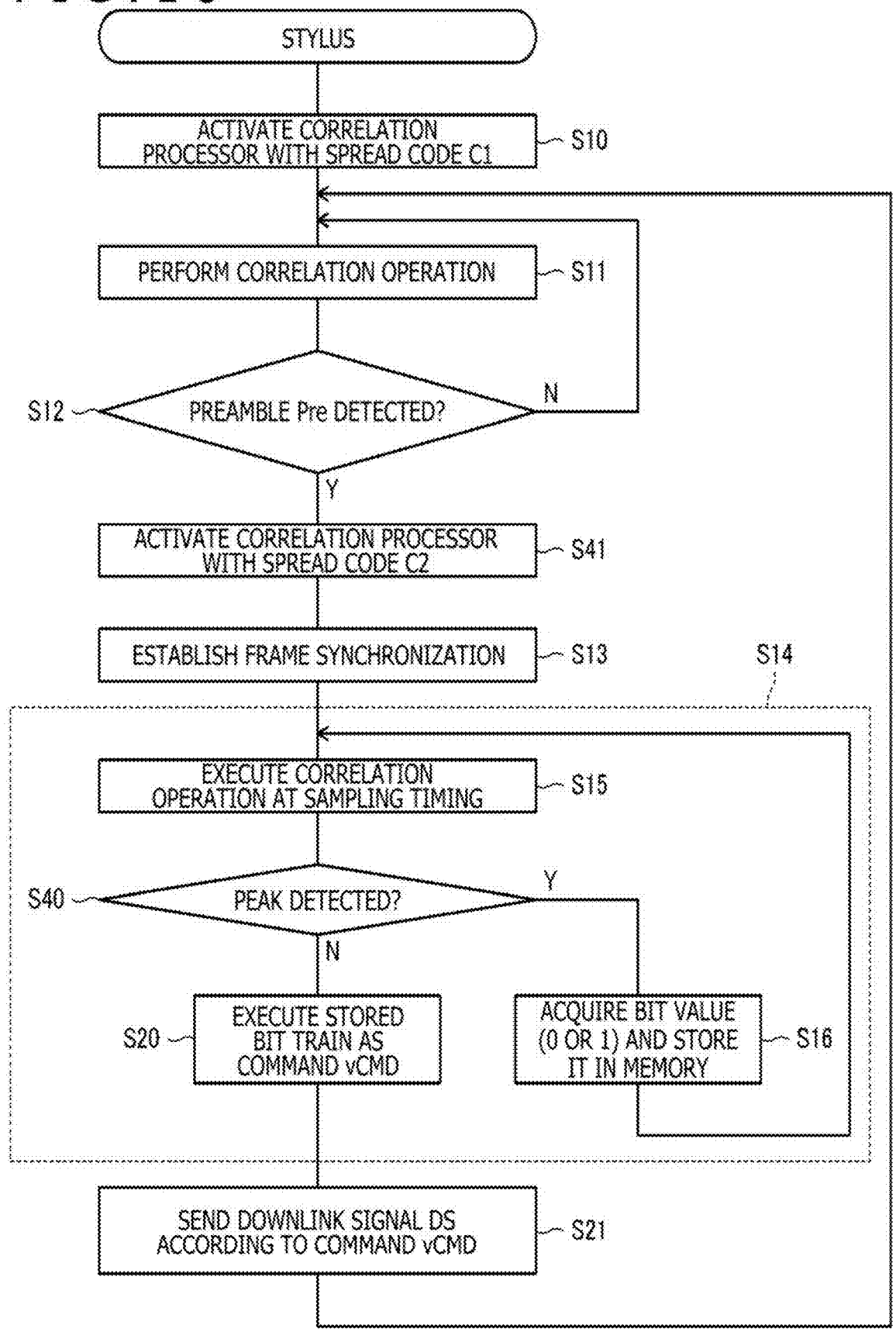
FIG. 16 is a flowchart illustrating operation of a stylus according to the second embodiment of the present invention.

FIG. 16 is a flowchart illustrating operation of the stylus 2 according to the present embodiment. The processing sequence illustrated in FIG. 16 is different from the processing sequence illustrated in FIG. 14 in that a process (step S41) for activating the correlation processor 71b with the spread code C2 is inserted between step S12 and step S13. By carrying out step S41, the stylus 2 can detect each of the bits of the variable-length command vCMD and the command end value EoC based on the spread code C2.

According to the present embodiment, as described above, since the code length of the spread code used after frame synchronization, i.e., the spread code C2, is shorter than the code length of the spread code used for synchronization, i.e., the spread code C1, the uplink signal occupancy ratio can further be reduced. Though the shorter spread code leads to a corresponding reduction in noise resistance, since the sampling timing is known after frame synchronization, higher noise resistance can be achieved than before frame synchronization. According to the present embodiment, therefore, though the spread code used after frame synchronization is shorter, it is possible to achieve noise resistance equivalent to that before frame synchronization.

A third embodiment of the present invention will be described below. The present embodiment is also based on the third modification of the first embodiment, but is different therefrom in that three protocols P1 through P3 are selectively used depending on the kind of the sensor controller 31 with which the stylus 2 communicates and that spread codes used to send a preamble Pre are common in the protocols whereas spread codes used to send a variable-length command vCMD are different from protocol to protocol, or specifically, spread codes C1 through C3 are used respectively in the protocols P1 through P3. According to the present embodiment, stated otherwise, an uplink signal US is made compatible with the multiple protocols by selectively using the spread codes C1 through C3. Those parts which are identical to those of the third modification of the first embodiment will hereinafter be denoted by identical reference characters, and the differences with the third modification of the first embodiment will be focused on and described below.

Figure 17:
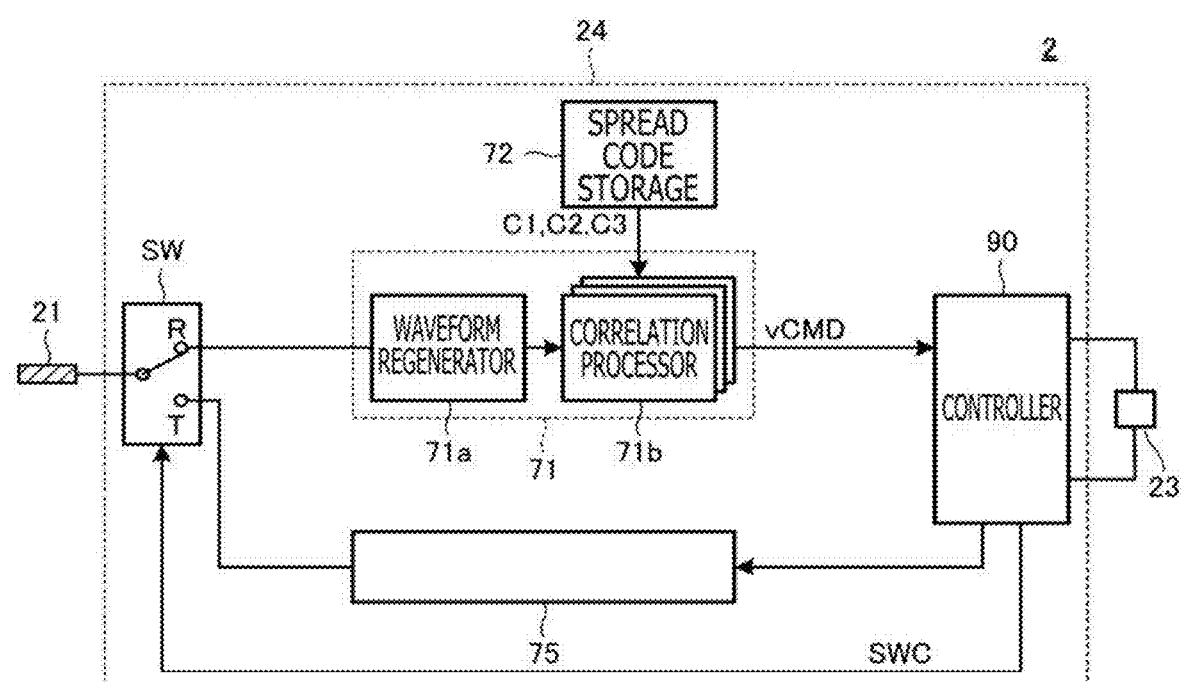
FIG. 17 is a substantial block diagram illustrating functional blocks of a stylus according to a third embodiment of the present invention.

FIG. 17 is a substantial block diagram illustrating functional blocks of the stylus 2 according to the present embodiment. As can be understood from a comparison between FIG. 17 and FIG. 4, the stylus 2 according to the present embodiment is different from the stylus 2 described according to the first embodiment in that it has three correlation processors 71b. As described in detail later, the three correlation processors 71b are used to perform correlation operations with respective spread coders C31, C32, C33, i.e., spread code variations of the spread code C3, for the stylus 2 to receive a variable-length command vCMD using the spread code C3. The stylus 2 uses only one of the three correlation processors 71b for receiving a variable-length command vCMD using the spread code C1 or the spread code C2.

Furthermore, the stylus 2 according to the present embodiment operates in either one of three operation modes corresponding respectively to the protocols P1 through P3. A present operation mode is set when the user presses a side switch, not illustrated, on the stylus 2.

Figures 18A, 18B:
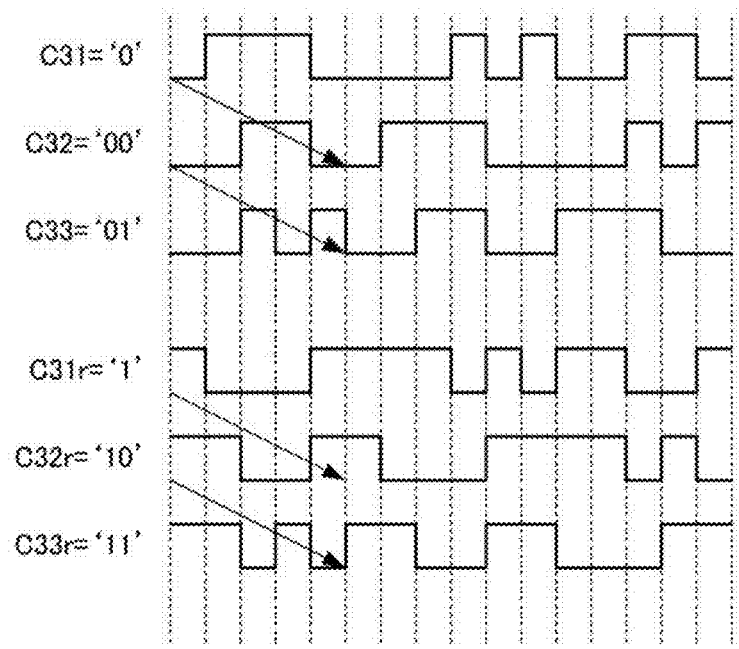
FIGS. 18A and 18B are diagrams illustrating a spread code illustrated in FIG. 15.

FIGS. 18A and 18B are diagrams illustrating the spread code C3. FIG. 18A illustrates the spread code C1 used for detecting a preamble Pre and the spread code C1r which is a reversal of the spread code C1, as a reference for an understanding of the spread code C3. As illustrated in FIG. 18A, the spread code C1 is a 16-chip PN code "0111000010100110" and the spread code C1r is a PN code "1000111101011001."

FIG. 18B illustrates spread codes C31, C32, C33, C31r, C32r, C33r that come under the spread code C3. As illustrated in FIG. 18B, the spread code C31 is identical to the spread code C1. The spread code C32 is a spread code obtained by shifting the spread code C31 by five bits. The spread code C33 is a spread code obtained by shifting the spread code C32 by five bits. The spread code C31r is a PN code identical to the spread code C1r. The spread code C32r is a spread code obtained by shifting the spread code C31r by five bits. The spread code C33r is a spread code obtained by shifting the spread code C32r by five bits. As a consequence, the spread code C31r is equal to a spread code obtained by reversing the spread code C31, the spread code C32r is equal to a spread code obtained by reversing the spread code C32, and the spread code C33r is equal to a spread code obtained by reversing the spread code C33. The spread code C3 is thus able to express multiple values by combining spread codes (three spread codes C31, C32, C33) produced by cyclically shifting the spread code C1 by five bits and spread codes (two positive and negative spread code types) produced by reversing the polarity of the spread code C1. Specifically, the spread codes C31, C32, C33, C31r, C32r, C33r are associated respectively with 1-bit "0," 2-bit "00," 2-bit "01," 1-bit "1," 2-bit "10," and 2-bit "11."

Figure 19:
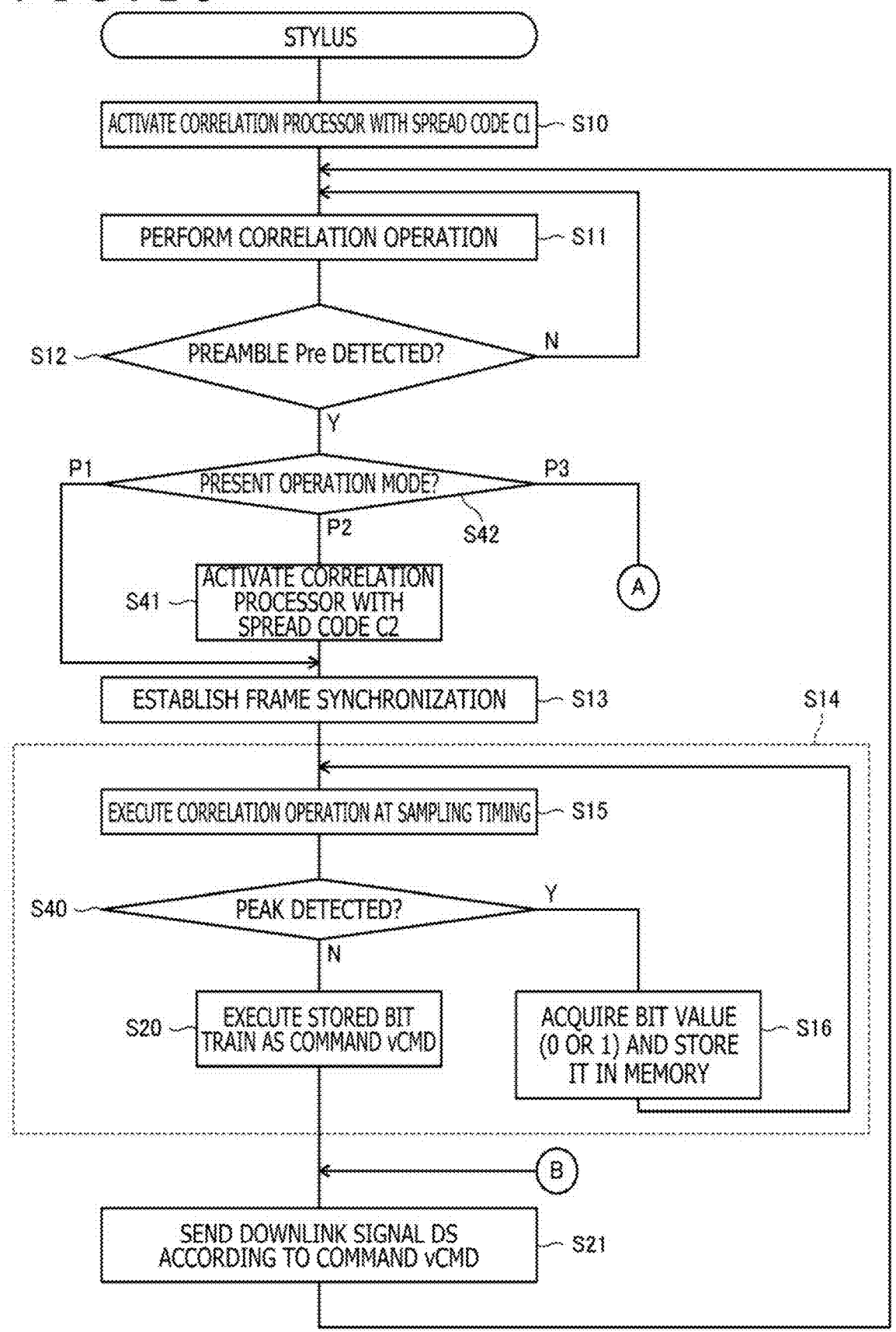
FIG. 19 is a flowchart illustrating operation of a stylus according to the third embodiment of the present invention.
Figure 20:
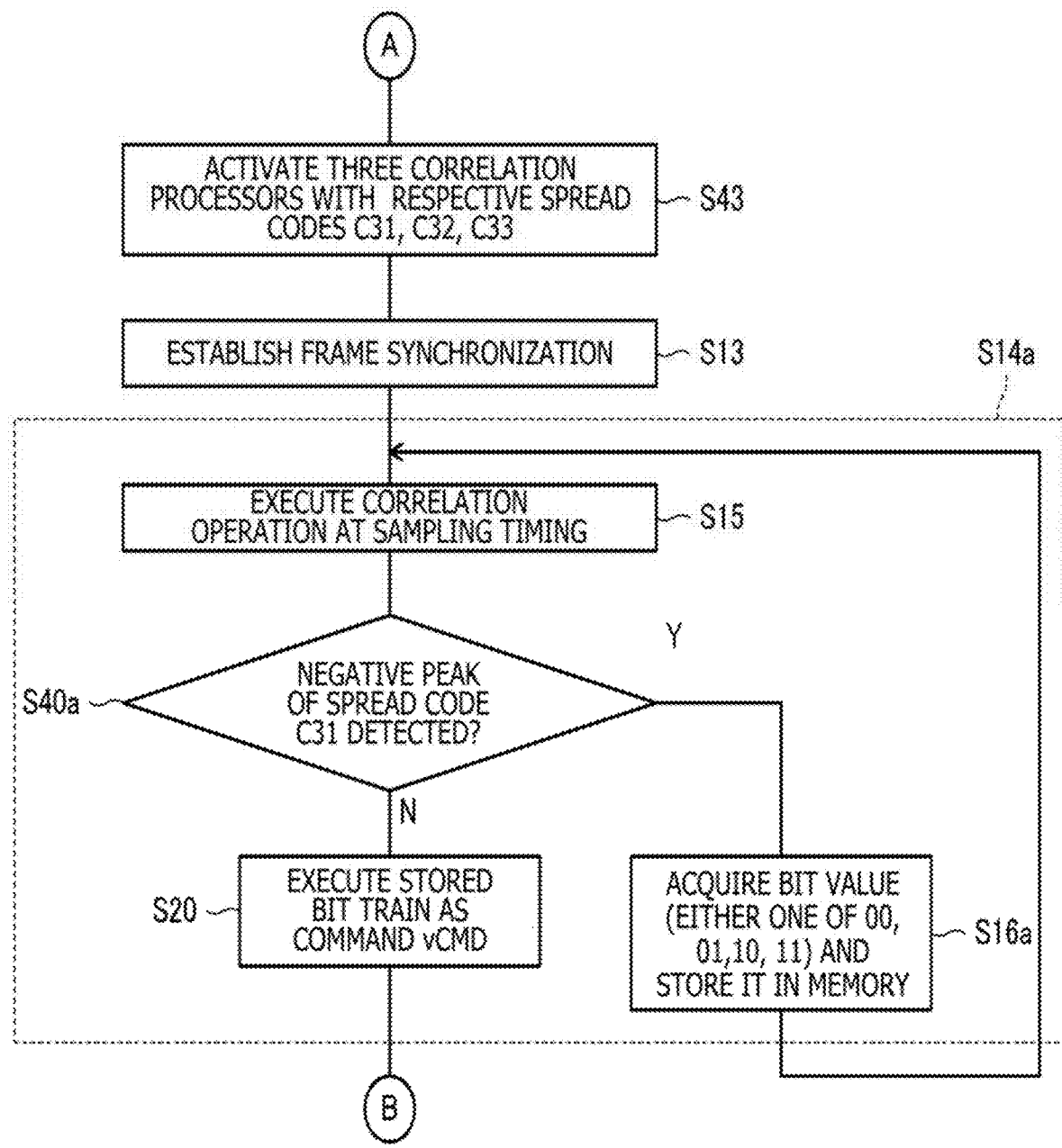
FIG. 20 is a flowchart illustrating operation of the stylus according to the third embodiment of the present invention.

FIGS. 19 and 20 are flowcharts illustrating operation of the stylus 2 according to the present embodiment. The processing sequence illustrated in FIGS. 19 and 20 is different from the processing sequence illustrated in FIG. 16 in that a present operation mode of the stylus 2 is determined as corresponding to either one of the protocols P1 through P3 when a preamble Pre is detected in step S12 (step S42), that step S41 is not performed if a present operation mode is determined as corresponding to the protocol P1, and that step S43 is performed and step S14a is performed instead of step S14 if a present operation mode is determined as corresponding to the protocol P3.

More specifically, first in step S42, the stylus 2 determines whether a present operation mode corresponds to either one of the protocols P1 through P3 (step S42). For example, the stylus 2 may determine a present operation mode by referring to a present operation mode that has been set by the user.

If the stylus 2 determines a present operation mode as corresponding to the protocol P1 in step S42, then the stylus 2 continues to use the spread code C1 used to receive the preamble Pre for the reception of a variable-length command vCMD. The operation of the stylus 2 in this case is the same as the operation of the stylus 2 described above with reference to FIG. 14.

If the stylus 2 determines a present operation mode as corresponding to the protocol P2 in step S42, then the stylus 2 activates the correlation processors 71b with the spread code C2 that is shorter than the spread code C1 (step S41). The operation of the stylus 2 in this case is the same as the operation of the stylus 2 described above with reference to FIG. 16.

If the stylus 2 determines a present operation mode as corresponding to the protocol P3 in step S42, then the stylus 2 activates the three correlation processors 71b respectively with the spread codes C31, C32, C33 (step S43), as illustrated in FIG. 20. After having acquired a sampling timing in step S13, the stylus 2 receives a variable-length command vCMD (step S14a).

The processing of step S14a is different from the processing illustrated in FIGS. 14 and 16 in that steps S16a, S40a are carried out instead of respective steps S16, S40. Specifically, after the stylus 2 has caused the three correlation processors 71b to perform respective correlation operations at a sampling timing (step S15), the stylus 2 determines whether a negative peak of the spread code C31 is detected or not (step S40a). If the stylus 2 determines that a negative peak of the spread code C31 is not detected, then since positive or negative peak values of the spread codes C32, C33 must be obtained, the stylus 2 acquires a 2-bit value depending on the kind of the obtained peak values, and stores the acquired bit value in a memory, not illustrated, as a value of part of the variable-length command vCMD (step S16a). If a positive or negative peak value of either one of the spread codes C31, C32, C33 is not obtained, then the stylus 2 may regard the reception of an uplink signal US as a failure, and may carry out a predetermined error process.

If the stylus 2 determines that a negative peak of the spread code C31 is detected in step S40a, then the stylus 2 acquires the values of a bit train stored in the memory so far as the values of the variable-length command vCMD, and executes or interprets the acquired bit train as a command (step S20). Thereafter, control goes back to step S19 (FIG. 19) in which the stylus 2 sends a downlink signal DS.

Figure 21:
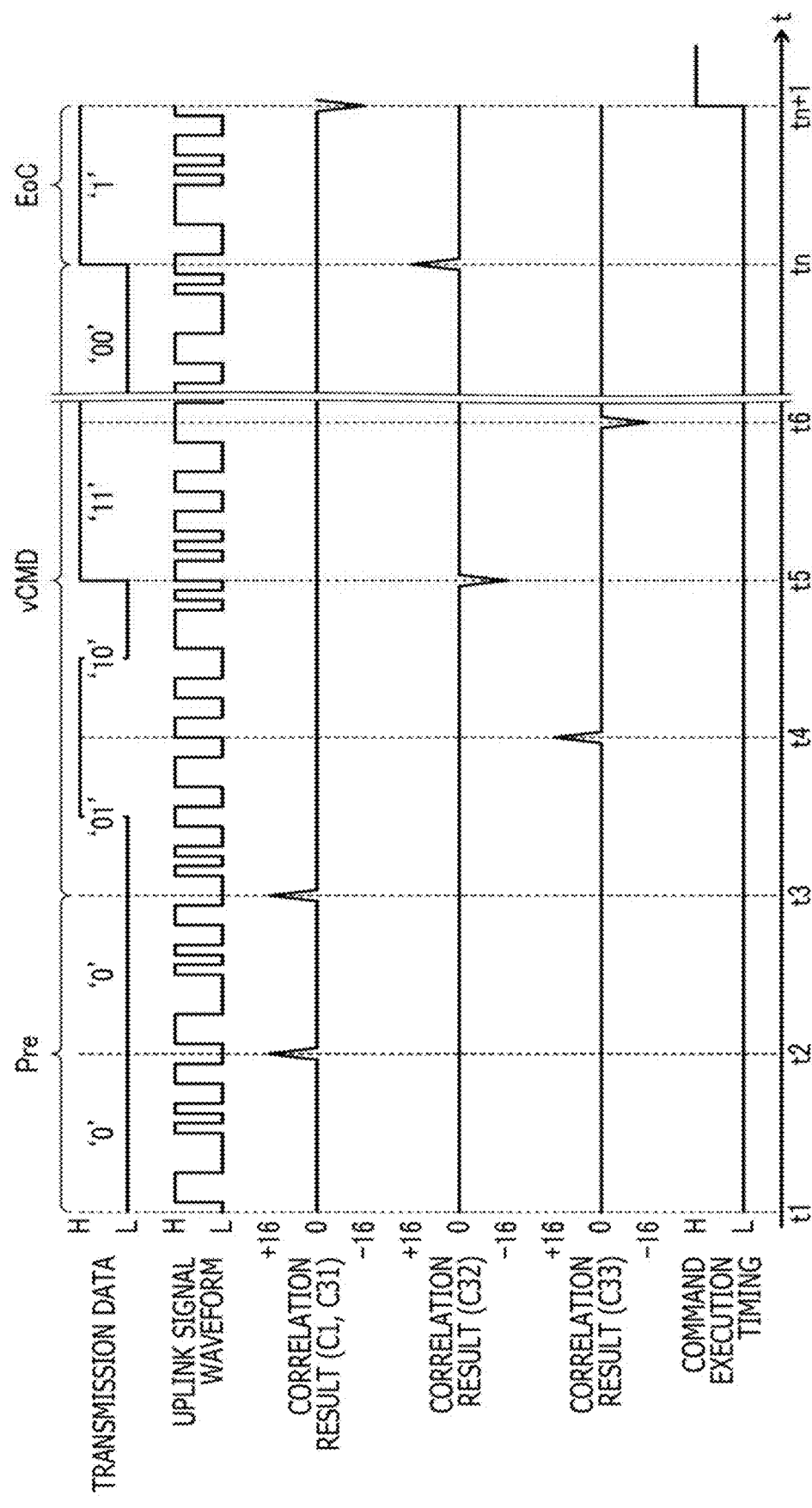
FIG. 21 is a diagram illustrating a method for sending and receiving a variable-length command according to the third embodiment of the present invention.

FIG. 21 is a diagram illustrating a method for sending and receiving a variable-length command vCMD according to the present embodiment. FIG. 21 illustrates that the sensor controller 31 is of the type for sending a variable-length command vCMD using the spread code C3.

As illustrated in FIG. 21, the sensor controller 31 spreads "00" corresponding to a preamble Pre with the direct spreader 63 illustrated in FIG. 2, using the 16-chip spread code C1 and sends the spread preamble Pre (times t1 through t3). Then, the sensor controller 31 sends a variable-length command vCMD. At this time, the sensor controller 31 spreads a bit train representing the variable-length command vCMD using the spread codes C32, C33, C32r, C33r (times t3 through tn). Since the spread codes C32, C33, C32r, C33r can express 2-bit data, as described above, the sensor controller 31 sends the data of the variable-length command vCMD by 2 bits at a time. The stylus 2 receives the spread codes C32, C33, C32r, C33r thus sent using the three correlation processors 71b.

Finally, the sensor controller 31 sends the spread code C31r representing "1." The spread code C31r thus sent corresponds to the command end value EoC described above. The stylus 2 detects the command end value EoC by detecting the spread code C31r, and executes the variable-length command vCMD represented by the bit train received so far.

According to the present embodiment, as described above, it is possible to make the stylus 2 compatible with a plurality of protocols. Inasmuch as one spread code C3 is capable of sending 2-bit data when it is used to send and receive the variable-length command vCMD, the transmission rate can be increased by using the spread code C3 compared with using the spread code C1. Accordingly, the time length of the uplink signal US can be reduced.

FIGS. 22A and 22B are diagrams illustrating a method for sending and receiving variable-length commands vCMD according to a modification of the third embodiment of the present invention. FIGS. 22A and 22B illustrate that a sensor controller 31 is of the type for sending a variable-length command vCMD using the spread code C3, as with FIG. 21. The method illustrated in FIGS. 22A and 22B is also applicable to a sensor controller that is of the type for sending a variable-length command vCMD using the spread code C1 or C2. The present modification is different from the third embodiment in that information representing the length of a variable-length command vCMD is included in a preamble Pre rather than sending a command end value EoC by sending the spread code C31r. The present modification will be described in detail below.

According to the present modification, a plurality of preambles Pre are prepared in advance depending on the lengths of variable-length commands vCMD. Specifically, a preamble Pre having a value "00" is prepared in association with a variable-length command vCMD having a length of 4 bits (see FIG. 22A), and a preamble Pre having a value "01" is prepared in association with a variable-length command vCMD having a length of 2×(n−2) bits (n is 18, for example) (see FIG. 22B). The sensor controller 31 selects the value of a preamble Pre depending on the length of a variable-length command vCMD to be sent, and sends the preamble Pre in a stage prior to the variable-length command vCMD. At this time, "0" may be sent by using the spread code C1, and "1" may be sent by using the spread code C1r. The stylus 2 is thus capable of selectively receiving a plurality of preambles Pre depending on which of positive and negative peak values are represented by the result of a correlation operation with respect to the spread code C1.

With this arrangement, the stylus 2 is able to recognize the end position of the variable-length command vCMD without receiving the command end value EoC in the example illustrated in FIG. 21. Consequently, there is a possibility that the stylus 2 can execute the variable-length command vCMD earlier than with the example illustrated in FIG. 21.

According to the third embodiment, information designating a spread code used to send a variable-length command vCMD may be included in a preamble Pre. The stylus 2 may acquire the value of the information from the preamble Pre detected using the spread code C1, determine a spread code to be used to detect a variable-length command vCMD from the acquired value, and may, if necessary, switch from the spread code used by the correlation processors 71b to the determined spread code. The sensor controller 31 is thus capable of designating a spread code to be used to receive a variable-length command vCMD.

While the preferred embodiments of the present invention have been described above, the present invention is not limited to the illustrated embodiments, but may be reduced to practice in various ways without departing from the scope thereof.

According to the above embodiments, for example, a variable-length command vCMD includes a field of a predetermined number of bytes (see FIGS. 9 and 10). The phrase "predetermined number of bytes" may be replaced with a phrase "predetermined number of bits" or a phrase "predetermined number of words." The term "field" may include not only data representing one meaning, but also an arbitrary number of data, payload data, a detection code, padding, or a code representing a preamble.

While the preferred embodiments have been described above, it should be understood that the embodiments are illustrated by way of example only and various many changes and modifications may be made therein without departing from the scope of the appended claims.

What is claimed is:

1. A method carried out in a system including an active stylus and a sensor controller, the method comprising:
    transmitting, by the sensor controller, a first variable-length command including data of a variable number of bits;
    receiving, by the active stylus, an uplink signal having a variable time length;
    detecting, by the active stylus, the first variable-length command by decoding the uplink signal;
    determining, by the active stylus based on the first variable-length command, a time period during which the active stylus continues to detect the first variable-length command; and
    transmitting, by the active stylus, a downlink signal according to the first variable-length command.

2. The method according to claim 1, wherein:
    the first variable-length command includes a length field indicating the variable number of bits; and the active stylus determines the time period based on the variable number of bits indicated in the length field.

3. The method according to claim 1, wherein:
the first variable-length command includes one or more fields, each field having a predetermined bit length and including a flag indicating whether there is a next field.

4. The method according to claim 1, wherein:
the first variable-length command includes a plurality of fields, each field having a predetermined bit length, including a flag indicating whether there is a next field, and including a cyclic redundancy check (CRC) field including an error detection value; and
the method comprises, for each of the plurality of fields of the first variable-length command:
calculating, by the active stylus, an error detection value from a bit train included in the field; and
comparing, by the active stylus, the calculated error detection value with the error detection value included in the CRC field of the field;
wherein, the active stylus transmits the downlink signal responsive to determining that each of the calculated error detection values agrees with the error detection value included in the CRC field of the field.

5. The method according to claim 1, wherein:
the first variable-length command includes at least a first field and a second field that follows the first field; and
the method comprises:
transmitting, by the sensor controller, the second field continuously after the first field.

6. The method according to claim 1, wherein:
the first variable-length command includes at least a first field and a second field that follows the first field; and
the method comprises:
transmitting, by the sensor controller, the second field after a defined lapse of time after transmitting the first field.

7. The method according to claim 1, wherein:
the first variable-length command includes an end field indicating a tail end of the first variable-length command; and
the method comprises:
detecting, by the active stylus, the end field of the first variable-length command; and
responsive to detecting the end field, stopping, by the active stylus, the receiving of the uplink signal.

8. The method according to claim 7, comprising:
correlating, by the active stylus, a spread code and the uplink signal; and
detecting, by the active stylus, the end field if a peak value is not observed as a result of the correlating of the spread code and the uplink signal.

9. The method according to claim 8, comprising:
spreading, by the sensor controller, a bit train representing the first variable-length command with the spread code to obtain the uplink signal; and
after transmitting the uplink signal, detecting, by the sensor controller, the downlink signal for a period of time that is at least as long as the duration of the spread code.

10. A sensor controller, comprising:
a transmitter, which, in operation, transmits a first variable-length command including data of a variable number of bits, using an uplink signal having a variable time length; and
a receiver, which, in operation, receives from an active stylus a downlink signal according to the first variable-length command, wherein the active stylus detects the first variable-length command by decoding the uplink signal.

11. The sensor controller according to claim 10, wherein:
the first variable-length command includes a length field indicating the variable number of bits of the first variable-length command.

12. The sensor controller according to claim 10, wherein:
the first variable-length command includes one or more fields, each field having a predetermined bit length and including at least one of:
a flag indicating whether there is a next field, or
a cyclic redundancy check (CRC) field including an error detection value.

13. The sensor controller according to claim 10, wherein:
the sensor controller is configured to spread a bit train representing the first variable-length command with a spread code to generate the uplink signal; and
after the transmitter transmits the uplink signal, the receiver receives the downlink signal for a period of time that is at least as long as the duration of the spread code.

14. An active stylus, comprising:
a receiver, which, in operation, receives an uplink signal having a variable time length;
a processor, which, in operation,
detects a first variable-length command including data of a variable number of bits, by decoding the uplink signal;
determines, based on the first variable-length command, a time period during which the processor continues to detect the first variable-length command; and
a transmitter, which, in operation, transmits a downlink signal according to the first variable-length command.

15. The active stylus according to claim 14, wherein:
the first variable-length command includes a length field indicating the variable number of bits; and
the processor, in operation, determines the time period based on the variable number of bits indicated in the length field.

16. The active stylus according to claim 14, wherein:
the first variable-length command includes one or more fields, each field having a predetermined bit length and including a flag indicating whether there is a next field.

17. The active stylus according to claim 14, wherein:
the first variable-length command includes a plurality of fields, each field having a predetermined bit length, including a flag indicating whether there is a next field, and including a cyclic redundancy check (CRC) field including an error detection value; and
the processor, for each of the plurality of fields:
calculates an error detection value from a bit train included in the field;
compares the calculated error detection value with the error detection value included in the CRC field of the field; and
controls the transmitter to transmit the downlink signal responsive to determining that each of the calculated error detection values agrees with the error detection value included in the CRC field of the field.

18. The active stylus according to claim 14, wherein:
the first variable-length command includes an end field indicating a tail end of the first variable-length command; and the processor, in operation:
  detects the end field of the first variable-length command; and
  responsive to detecting the end field, controls the receiver to stop the receiving of the uplink signal.

19. The active stylus according to claim 18, wherein:
the processor, in operation,
  correlates a spread code and the uplink signal; and
  detects the end field if a peak value is not observed as a result of the correlating of the spread code and the uplink signal.

20. The active stylus according to claim 19, wherein:
the processor, in operation, spreads a bit train representing the first variable-length command with the spread code to obtain the uplink signal.

* * * * *